US012705309B2

(12) United States Patent
Kingetsu

(10) Patent No.: US 12,705,309 B2

(45) Date of Patent: Aug. 11, 2026

(54) COMPUTER-IMPLEMENTED DETECTION METHOD FOR DETECTING ACCURACY DEGRADATION OF MACHINE LEARNING MODEL, NON-TRANSITORY COMPUTER-READABLE RECORDING MEDIUM, AND COMPUTING SYSTEM

(71) Applicant: FUJITSU LIMITED, Kawasaki (JP)

(72) Inventor: Hiroaki Kingetsu, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 1014 days.

(21) Appl. No.: 17/694,716

(22) Filed: Mar. 15, 2022

(65) Prior Publication Data

US 2022/0207307 A1 Jun. 30, 2022

Related U.S. Application Data

(63) Continuation of application No. PCT/JP2019/041690, filed on Oct. 24, 2019.

(51) Int. Cl.

*G06F 18/2411* (2023.01)
*G06F 18/20* (2023.01)
*G06F 18/214* (2023.01)

(52) U.S. Cl.

CPC ........ *G06F 18/2411* (2023.01); *G06F 18/214* (2023.01); *G06F 18/285* (2023.01)

(58) Field of Classification Search

CPC .. G06F 18/2411; G06F 18/214; G06F 18/285; G06F 18/217; G06N 20/00

See application file for complete search history.

(56) References Cited

U.S. PATENT DOCUMENTS

2018/0075360 A1 3/2018 Tanimoto et al.
2018/0268292 A1* 9/2018 Choi .................... G06V 10/454
2019/0205748 A1* 7/2019 Fukuda .................. G06N 3/044

(Continued)

FOREIGN PATENT DOCUMENTS

JP 2019-164774 A 9/2019
WO 2016/152053 A1 9/2016

OTHER PUBLICATIONS

Ao, Shuang, Xiang Li, and Charles Ling. "Fast generalized distillation for semi-supervised domain adaptation." Proceedings of the AAAI Conference on Artificial Intelligence. vol. 31. No. 1. 2017. (Year: 2017).*

(Continued)

*Primary Examiner* — Matthew Ell
*Assistant Examiner* — Humaira Zahin Mauni
(74) *Attorney, Agent, or Firm* — XSENSUS LLP

(57) ABSTRACT

A computing system calculates, by using an inspector model, whether or not the plurality of pieces of training data are located in a vicinity of the decision boundary, acquires a first proportion of the training data, calculates, by using the inspector model, whether or not a plurality of pieces of operation data associated with one of correct answer labels out of the plurality of correct answer labels are located in a vicinity of the decision boundary, and acquires a second proportion of the operation data located in the vicinity of the decision boundary out of all of the pieces of operation data and detects, based on the first proportion and the second proportion, a change in the output result of the machine learning model caused by a temporal change in a tendency of the operation data.

12 Claims, 23 Drawing Sheets

(56) References Cited

U.S. PATENT DOCUMENTS

| | | | | |
|---|---|---|---|---|
| 2020/0110982 | A1* | 4/2020 | Gou | G06N 3/088 |
| 2021/0034985 | A1* | 2/2021 | Vongkulbhisal | G06F 16/908 |

OTHER PUBLICATIONS

International Search Report and Written Opinion mailed on Jan. 7, 2020, received for PCT Application—PCT/JP2019/041690, Filed on Oct. 24, 2019, 6 pages including English Translation.

Shabbak et al., "An Improvement of the Hotelling T2 Statistic in Monitoring Multivariate Quality Characteristics", Mathematical Problems in Engineering, vol. 2012, Article ID 531864, 15 pages.

Romero et al., "FitNets: Hints for Thin Deep Nets", Published as a conference paper at ICLR 2015, arXiv:1412.6550v4, Mar. 27, 2015, pp. 1-13.

* cited by examiner

141a

| RECORD NUMBER | TRAINING DATA | CORRECT ANSWER LABEL |
|---|---|---|
| 1001 | TRAINING DATA WITH RECORD NUMBER "1001" | FIRST CLASS |
| 1002 | TRAINING DATA WITH RECORD NUMBER "1002" | FIRST CLASS |
| 1003 | TRAINING DATA WITH RECORD NUMBER "1003" | FIRST CLASS |
| ... | ... | ... |
| 1050 | TRAINING DATA WITH RECORD NUMBER "1050" | SECOND CLASS |
| 1051 | TRAINING DATA WITH RECORD NUMBER "1051" | SECOND CLASS |
| ... | ... | ... |

| RECORD NUMBER | INPUT DATA | SOFT TARGET |
|---|---|---|
| 1001 | INPUT DATA WITH RECORD NUMBER "1001" | OUTPUT RESULT OBTAINED WHEN INPUT DATA WITH RECORD NUMBER "1001" IS INPUT TO MACHINE LEARNING MODEL |
| 1002 | INPUT DATA WITH RECORD NUMBER "1002" | OUTPUT RESULT OBTAINED WHEN INPUT DATA WITH RECORD NUMBER "1002" IS INPUT TO MACHINE LEARNING MODEL |
| 1003 | INPUT DATA WITH RECORD NUMBER "1003" | OUTPUT RESULT OBTAINED WHEN INPUT DATA WITH RECORD NUMBER "1003" IS INPUT TO MACHINE LEARNING MODEL |
| ... | ... | ... |
| 1050 | INPUT DATA WITH RECORD NUMBER "1050" | OUTPUT RESULT OBTAINED WHEN INPUT DATA WITH RECORD NUMBER "1050" IS INPUT TO MACHINE LEARNING MODEL |
| 1051 | INPUT DATA WITH RECORD NUMBER "1051" | OUTPUT RESULT OBTAINED WHEN INPUT DATA WITH RECORD NUMBER "1051" IS INPUT TO MACHINE LEARNING MODEL |
| ... | ... | ... |

| DATA IDENTIFICATION INFORMATION | OPERATION DATA SET |
|---|---|
| C0 | OPERATION DATA SET WITH DATA IDENTIFICATION INFORMATION "C0" |
| C1 | OPERATION DATA SET WITH DATA IDENTIFICATION INFORMATION "C1" |
| C2 | OPERATION DATA SET WITH DATA IDENTIFICATION INFORMATION "C2" |
| C3 | OPERATION DATA SET WITH DATA IDENTIFICATION INFORMATION "C3" |

OPERATION DATA SET C0
35
32
31
FIRST PROPORTION "0.02"
NOT DETECTED
OPERATION DATA SET C1
SECOND PROPORTION "0.09"
DETECTED
OPERATION DATA SET C2
SECOND PROPORTION "0.05"
DETECTED
OPERATION DATA SET C3
SECOND PROPORTION "0.0025"
DETECTED

| RECORD NUMBER | TRAINING DATA | CORRECT ANSWER LABEL |
|---|---|---|
| 1001 | TRAINING DATA WITH RECORD NUMBER "1001" | FIRST CLASS |
| 1002 | TRAINING DATA WITH RECORD NUMBER "1002" | FIRST CLASS |
| 1003 | TRAINING DATA WITH RECORD NUMBER "1003" | FIRST CLASS |
| ... | ... | ... |
| 1050 | TRAINING DATA WITH RECORD NUMBER "1050" | SECOND CLASS |
| 1051 | TRAINING DATA WITH RECORD NUMBER "1051" | SECOND CLASS |
| ... | ... | ... |
| 1100 | TRAINING DATA WITH RECORD NUMBER "1100" | THIRD CLASS |
| 1101 | TRAINING DATA WITH RECORD NUMBER "1101" | THIRD CLASS |
| ... | ... | ... |

FIG.24

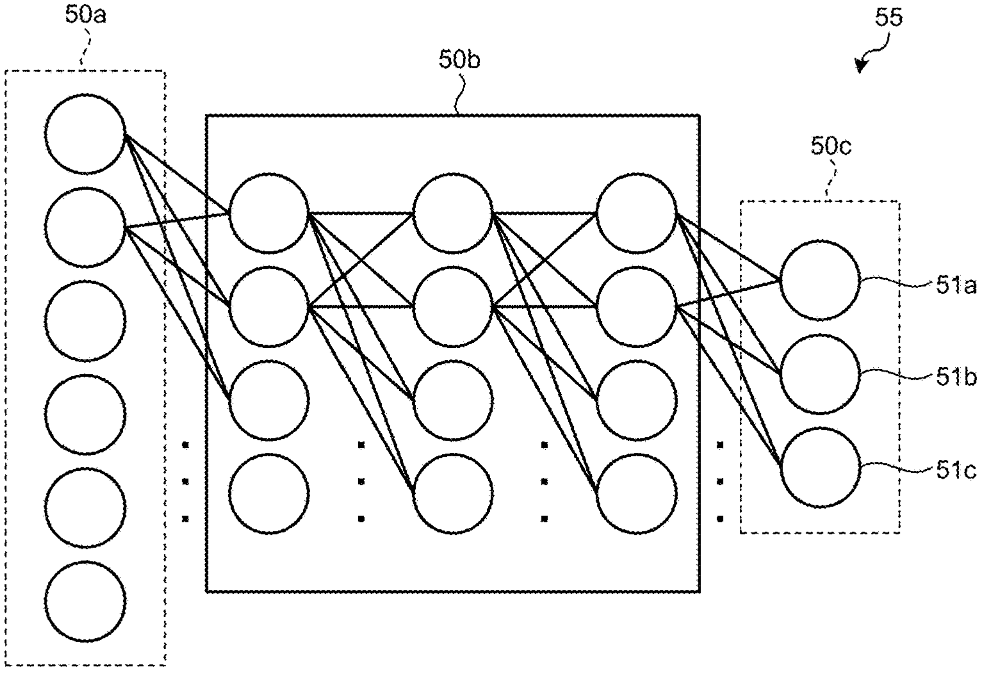

300
COMPUTING SYSTEM

310 COMMUNICATION UNIT
320 INPUT UNIT
330 DISPLAY UNIT

350 CONTROL UNIT
351 TRAINING UNIT
352 CREATING UNIT
353 DETECTION UNIT
354 PREDICTION UNIT

340 STORAGE UNIT
341 TEACHER DATA
341a TRAINING DATA SET
341b VALIDATION DATA SET
342 MACHINE LEARNING MODEL DATA
343 DISTILLATION DATA TABLE
344 INSPECTOR MODEL DATA
345 OPERATION DATA TABLE

400 COMPUTER

401 CPU

402 INPUT DEVICE

403 DISPLAY

404 READING DEVICE

405 INTERFACE DEVICE

408 BUS

406 RAM

406a TRAINING PROCESS

406b CREATING PROCESS

406c DETECTION PROCESS

406d PREDICTION PROCESS

407 HARD DISK DEVICE

407a TRAINING PROGRAM

407b CREATING PROGRAM

407c DETECTION PROGRAM

407d PREDICTION PROGRAM

COMPUTER-IMPLEMENTED DETECTION METHOD FOR DETECTING ACCURACY DEGRADATION OF MACHINE LEARNING MODEL, NON-TRANSITORY COMPUTER-READABLE RECORDING MEDIUM, AND COMPUTING SYSTEM

CROSS-REFERENCE TO RELATED APPLICATION

This application is a continuation of International Application No. PCT/JP2019/041690, filed on Oct. 24, 2019, the entire contents of which are incorporated herein by reference.

FIELD

The embodiments discussed herein are related to a detection method or the like.

BACKGROUND

In recent years, implementation of machine learning models having a determination function, a classification function, and the like performed on data with respect to information systems that are used by business enterprises or the like is proceeding. Hereinafter, the information system is referred to as a "system". A machine learning model performs determination and classification in accordance with teacher data that is trained at the time of system development; therefore, if a tendency of input data is changed when the system is in operation, the accuracy of the machine learning model is degraded.

FIG. 32 is a diagram illustrating degradation of a machine learning model caused by a change in a tendency of input data. It is assumed that the machine learning model explained here is a model that is used for classifying the input data into one of a first class, a second class, and a third class, and, that is trained in advance on the basis of teacher data before the system is operated. In the teacher data, training data and validation data are included.

In FIG. 32, a distribution 1A indicates a distribution of the input data at the initial stage of the system operation. A distribution 1B indicates a distribution of the input data at a point of time after elapse of time T1 from the initial stage of the system operation. A distribution 1C indicates a distribution of the input data at a point of time after further elapse of time T2 from the initial stage of the system operation. It is assumed that the tendency (feature value, etc.) of the input data is changed in accordance with elapsed time. For example, if the input data is an image, the tendency of the input data is changed in accordance with the seasons or a time zone.

A decision boundary 3 indicates the boundaries between model application areas 3*a* to 3*c*. For example, the model application area 3*a* is an area in which training data belonging to the first class is distributed. The model application area 3*b* is an area in which training data belonging to the second class is distributed. The model application area 3*c* is an area in which training data belonging to the third class is distributed.

The star marks indicate pieces of input data that belong to the first class and that are to be classified into the model application area 3*a* when the input data belonging to the first class is input to the machine learning model. The triangle marks indicate pieces of input data that belong to the second class and that are to be classified into the model application area 3*b* when the input data belonging to the second class is input to the machine learning model. The circle marks indicate pieces of input data that belong to the third class and that are to be classified into the model application area 3*c* when the input data belonging to the third class is input to the machine learning model.

In the distribution 1A, all of the pieces of input data are distributed among normal model application areas. In other words, the pieces of input data denoted by the star mark are located in the model application area 3*a*, the pieces of input data denoted by the triangle mark are located in the model application area 3*b*, and the pieces of input data denoted by the circle mark are located in the model application area 3*c*.

In the distribution 1B, the tendency of the pieces of input data has been changed, so that, although all of the pieces of input data are distributed among normal model application areas, the distribution of the pieces of input data indicated by the star marks are changed in the direction of the model application area 3*b*.

In the distribution 1C, the tendency of the pieces of input data is further changed, some pieces of the input data indicated by the star marks move across the decision boundary 3 into the model application area 3*b*, and are not properly classified; therefore, a correct answer rate is decreased (i.e., the accuracy of the machine learning model is degraded).

Here, as a technology for detecting accuracy degradation of a machine learning model in operation, there is a conventional technology that uses $T^2$ statistic (Hoteling's T-square). In this conventional technology, a principal component analysis is performed on input data and a data group of normal data (training data), and the $T^2$ statistic of the input data is calculated. The $T^2$ statistic is the sum of squares of the distance from the origin of each of standardized principal components to the data. The conventional technology detects accuracy degradation of the machine learning model on the basis of a change in distribution of the $T^2$ statistic of the input data group. For example, the $T^2$ statistic of the input data group corresponds to the proportion of data having abnormal values.

Related arts are disclosed in A. Shabbak and H. Midi, "An Improvement of the Hotelling Statistic in Monitoring Multivariate Quality Characteristics", Mathematical Problems in Engineering, P. 1-15, 2012.

SUMMARY

According to an aspect of an embodiment, a computer-implemented detection method includes training a machine learning model by using a plurality of pieces of training data associated with one of correct answer labels out of three or more types of correct answer labels; training, based on an output result of the machine learning model, a decision boundary that classifies a feature space of data into a plurality of application areas and creating an inspector model used for calculating a distance from the decision boundary to operation data; determining, by using the inspector model, whether or not the plurality of pieces of training data are located in a vicinity of the decision boundary and acquiring a first proportion of the training data located in the vicinity of the decision boundary out of all of the pieces of training data, wherein a distance between the vicinity and the decision boundary is less than or equal to a threshold; calculating, by using the inspector model, whether or not a plurality of pieces of operation data associated with one of the correct answer labels out of three or more types of correct answer labels are located in the vicinity of the decision boundary and acquiring a second proportion of the operation data located in the vicinity of the decision boundary out of all of the pieces of operation data; and detecting, based on the first proportion and the second proportion, a change in the output result of the machine learning model caused by a temporal change in a tendency of the operation data.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 13 is a diagram illustrating an example of a data structure of a distillation data table according to the first embodiment;

FIG. 14 is a diagram illustrating an example of a data structure of an operation data table;

FIG. 23 is a diagram illustrating an example of a data structure of a training data set according to the second embodiment;

FIG. 24 is a diagram illustrating an example of a machine learning model according to the second embodiment;

DESCRIPTION OF EMBODIMENTS

However, with the conventional technology described above, it is difficult to apply the $T^2$ statistic to high-dimensional data, such as image data, and thus, it is not able to detect accuracy degradation of the machine learning model.

For example, in high-dimensional (several thousand to several tens of thousands of dimensional) data with a large amount of information from the beginning, if some dimensions are reduced by using the principal component analysis, most of the information is lost. As a result, important pieces of information (feature values) that are used to perform classification and determination are lost, so that it is not possible to properly detect abnormal data, and it is not detect accuracy degradation of the machine learning model.

Preferred embodiments of the present invention will be explained with reference to accompanying drawings. Furthermore, the present invention is not limited by the embodiments.

Before a first embodiment is described, a reference technology for detecting accuracy degradation of a machine learning model will be described. In the reference technology, accuracy degradation of a machine learning model is detected by using a plurality of monitoring devices by narrowing down a model application area under different conditions. In the description below, the monitoring device is referred to as an "inspector model".

Figure 1:
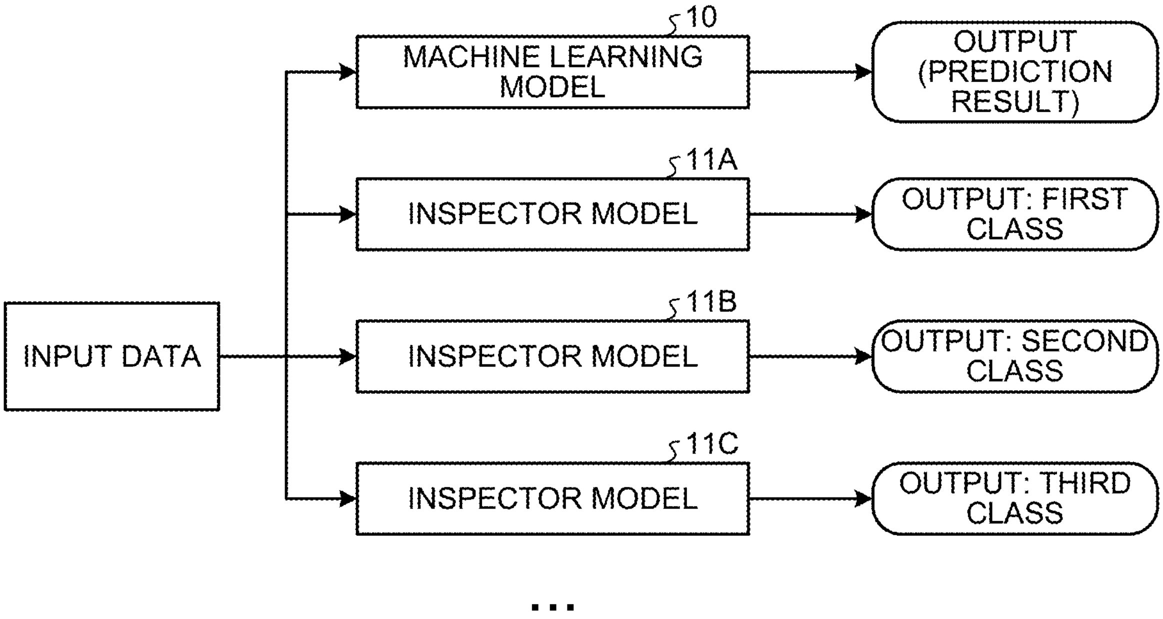
FIG. 1 is a diagram illustrating a reference technology.

FIG. 1 is a diagram illustrating a reference technology. A machine learning model 10 is a machine learning model that is obtained by performing machine training thereon by using teacher data. In the reference technology, accuracy degradation of the machine learning model 10 is detected. For example, in the teacher data, training data and validation data are included. The training data is used when machine training is performed on parameters of the machine learning model 10, and with which a correct answer label is associated. The validation data is data that is used when the machine learning model 10 is validated.

Inspector models 11A, 11B, 11C each have a model application area that is narrowed down under a different condition and have a different decision boundary. In the reference technology, some sort of alteration is carried out on the training data, the inspector models 11A to 11C are created by using the altered training data.

Each of the inspector models 11A to 11C has a different decision boundary, so that, even when same input data is input, output results may sometimes be different. In the reference technology, accuracy degradation of the machine learning model 10 is detected on the basis of the differences of the output results of the inspector models 11A to 11C. The example illustrated in FIG. 1 illustrates the inspector models 11A to 11C; however, accuracy degradation may be detected by using another inspector model. For the inspector models 11A to 11C, a deep neural network (DNN) is used.

In the reference technology, it is determined that the accuracy of the machine learning model 10 is not degraded in the case where all of the output results of the inspector models 11A to 11C are the same. In contrast, in the reference technology, accuracy degradation of the machine learning model 10 is detected in the case where the output results of the inspector models 11A to 11C are different.

Figure 2:
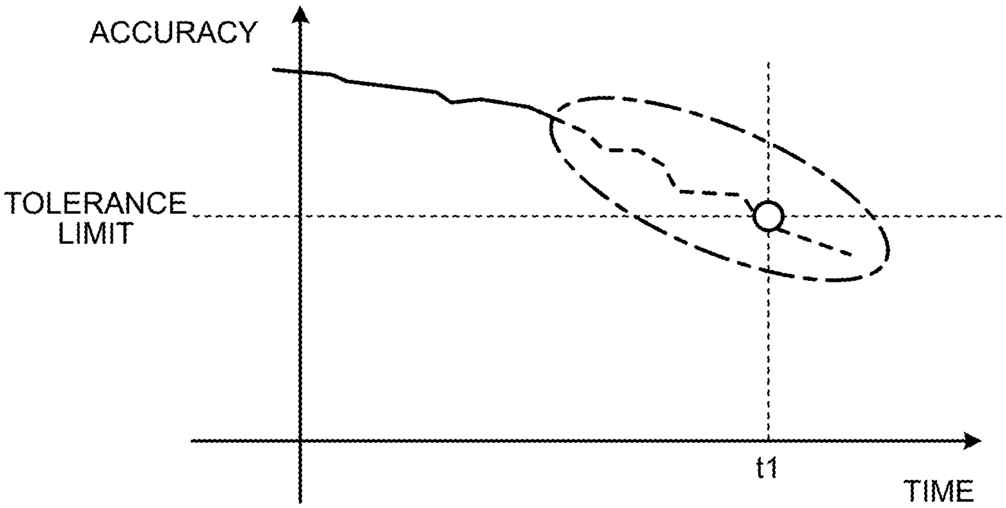
FIG. 2 is a diagram illustrating an example of accuracy degradation prediction.

FIG. 2 is a diagram illustrating an example of accuracy degradation prediction. The vertical axis of the graph illustrated in FIG. 2 is an axis corresponding to accuracy, whereas the horizontal axis is an axis corresponding to time. As illustrated in FIG. 2, accuracy is reduced in accordance with elapsed time and falls below a tolerance limit of accuracy at time t1. For example, in the reference technology, accuracy degradation (falling below the tolerance limit) is detected at time t1.

Figure 3:
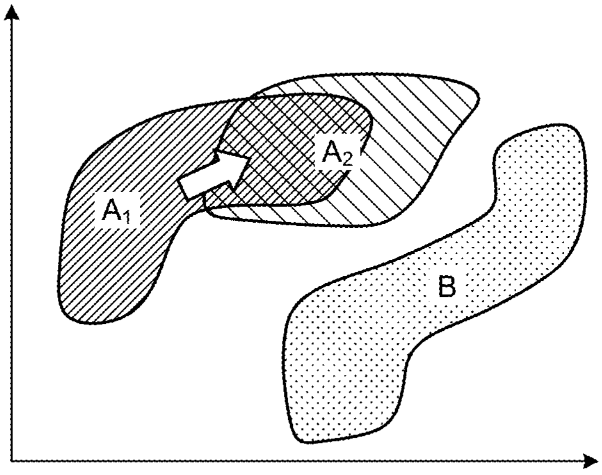
FIG. 3 is a diagram illustrating an example of concept drift.

Hereinafter, a change in distribution (feature value) of input data in accordance with elapsed time is referred to as concept drift. FIG. 3 is a diagram illustrating an example of concept drift. The vertical axis illustrated in FIG. 3 is the axis corresponding to a first feature value, whereas the horizontal axis is the axis corresponding to a second feature value. For example, at the start of operation of the machine learning model 10, a distribution of first data associated with a first class is referred to as a distribution $A_1$, whereas a distribution of second data associated with a second class is referred to as a distribution B.

In some cases, the distribution $A_1$ of the first data is changed to the distribution $A_2$ in accordance with elapsed time. The machine learning model 10, which is the original, is trained by regarding the distribution of the first data as the distribution $A_1$, so that the accuracy is reduced in accordance with elapsed time, and thus, retraining is needed.

Examples of data in which concept drift occurs include spam mails, electricity demand prediction, stock price prediction, strategic procedure of poker hands, images, and the like. For example, regarding the images, a feature value of each of the images varies in accordance with seasons or time zones even if the same subject is captured.

Here, in the reference technology described above, in order to detect accuracy degradation of the machine learning model 10, the plurality of inspector models 11A to 11C are created. In addition, in order to create the plurality of inspector models 11A to 11C, a condition that some sort of alteration be able to be carried out on the machine learning model 10 or the training data that is used at the time of training the machine learning model 10 is indispensable. For example, a condition that the machine learning model 10 be a specific training model, for example, the machine learning model 10 be a model used for calculating a certainty factor, is needed.

If so, a technique for detecting accuracy degradation of the machine learning model 10 consequently depends on the machine learning model. Various classification algorithms, such as a neural network (NN), a decision tree, a k-nearest neighbors algorithm, a support vector machine, is applicable to a classification algorithm of the machine learning model; therefore, there is a need to determine which detection technique is suitable for a technique for detecting accuracy degradation through trial and error in each of the classification algorithms.

In other words, it is desirable to detect accuracy degradation of the machine learning model 10 by creating an inspector model that is usable for many purposes even in any classification algorithm.

Figure 4:
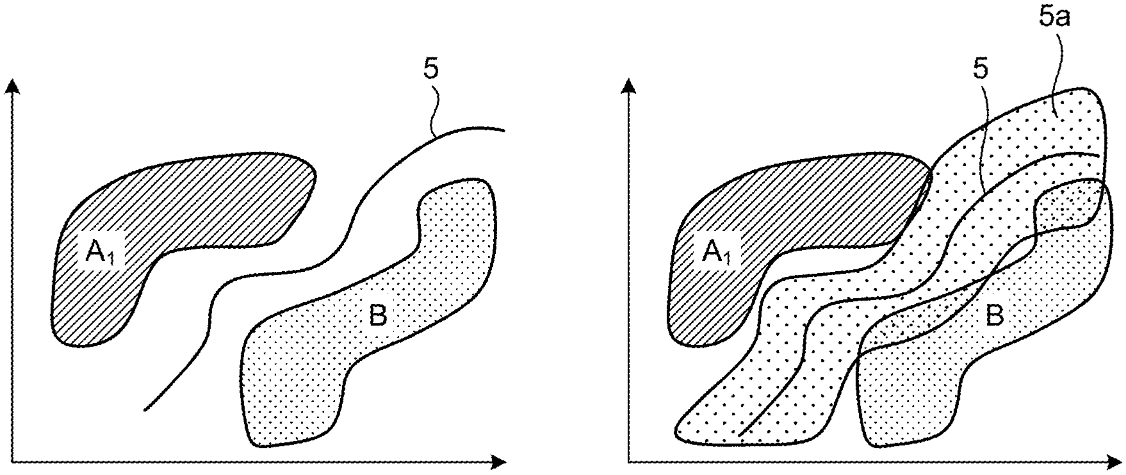
FIG. 4 is a diagram illustrating a basic mechanism of an inspector model.

FIG. 4 is a diagram illustrating a basic mechanism of the inspector model. For example, the inspector model is created by training a decision boundary 5 serving as a boundary between the distribution $A_1$ of the training data that belongs to the first class and the distribution B of the training data that belongs to the second class. In order to detect accuracy degradation of the machine learning model 10 with respect to operation data in accordance with elapsed time, a critical area 5*a* that includes the decision boundary 5 is monitored, and whether or not the number of pieces of operation data included in the critical area 5*a* is increased (or decreased), and, if the number of pieces of the operation data is increased (or decreased), accuracy degradation is detected.

In the description below, the training data is data that is used at the time of training a machine learning model corresponding to a monitoring target. The operation data is data that is classified into each of the classification classes by using the machine learning model, and it is assumed that a feature value is changed in accordance with elapsed time after the start of operation.

The computing system according to the first embodiment calculates, by using knowledge distillation (Knowledge Distiller: KD), an increase or decrease of the number of pieces of operation data included in the critical area 5*a* that includes the decision boundary 5, and detects accuracy degradation of the machine learning model.

Figure 5:
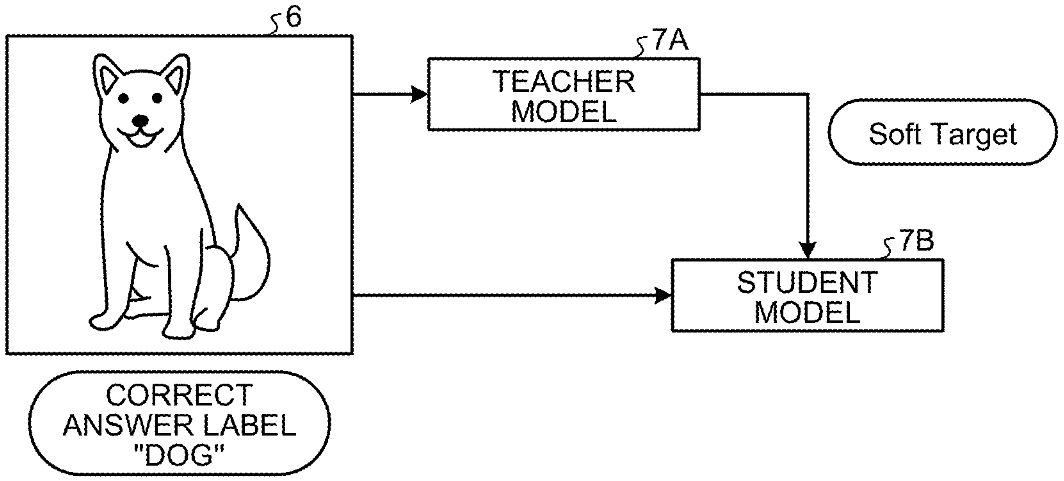
FIG. 5 is a diagram illustrating knowledge distillation.

FIG. 5 is a diagram illustrating knowledge distillation. In knowledge distillation, a Student model 7B that mimics an output value of a Teacher model 7A is constructed. For example, it is assumed that training data 6 is given and a correct answer label of "dog" is given to the training data 6. For convenience of description, the Teacher model 7A and the Student model 7B are assumed to be NNs; however, the models are not limited to the NNs.

The computing system trains (trains performed by using the backpropagation algorithm) the parameters of the Teacher model 7A such that the output result of the Teacher model 7A obtained at the time of inputting the training data 6 approaches the correct answer label of "dog". Furthermore, the computing system trains the parameters of the Student model 7B such that the output result of the Student model 7B obtained at the time of inputting the training data 6 approaches the output result of the Teacher model 7A. Hereinafter, an output of the Teacher model 7A is referred to as a "soft target". A correct answer label of the training data is referred to as a "hard target".

As described above, a technique for training related to the Teacher model 7A using the training data 6 and the hard target and training related to the Student model 7B using the training data 6 and the soft target is referred to as knowledge distillation. The computing system trains the Teacher model 7A and the Student model 7B by performing the same process on the other pieces of training data.

Here, training of the Student model 7B performed by using a soft target that is obtained by using a data space as an input is considered. If each of the Teacher model 7A and the Student model 7B is constructed by using a different model, the output result of the Student model 7B is trained so as to be similar to the decision boundary of the output result of the Teacher model 7A. If so, it is possible to use the Teacher model 7A as a machine learning model corresponding to the monitoring target and it is possible to use the Student model 7B as an inspector model. It is possible to create an inspector model that is usable for many purposes as a result of not narrowing down the model architecture of the Teacher model 7A.

Figure 6:
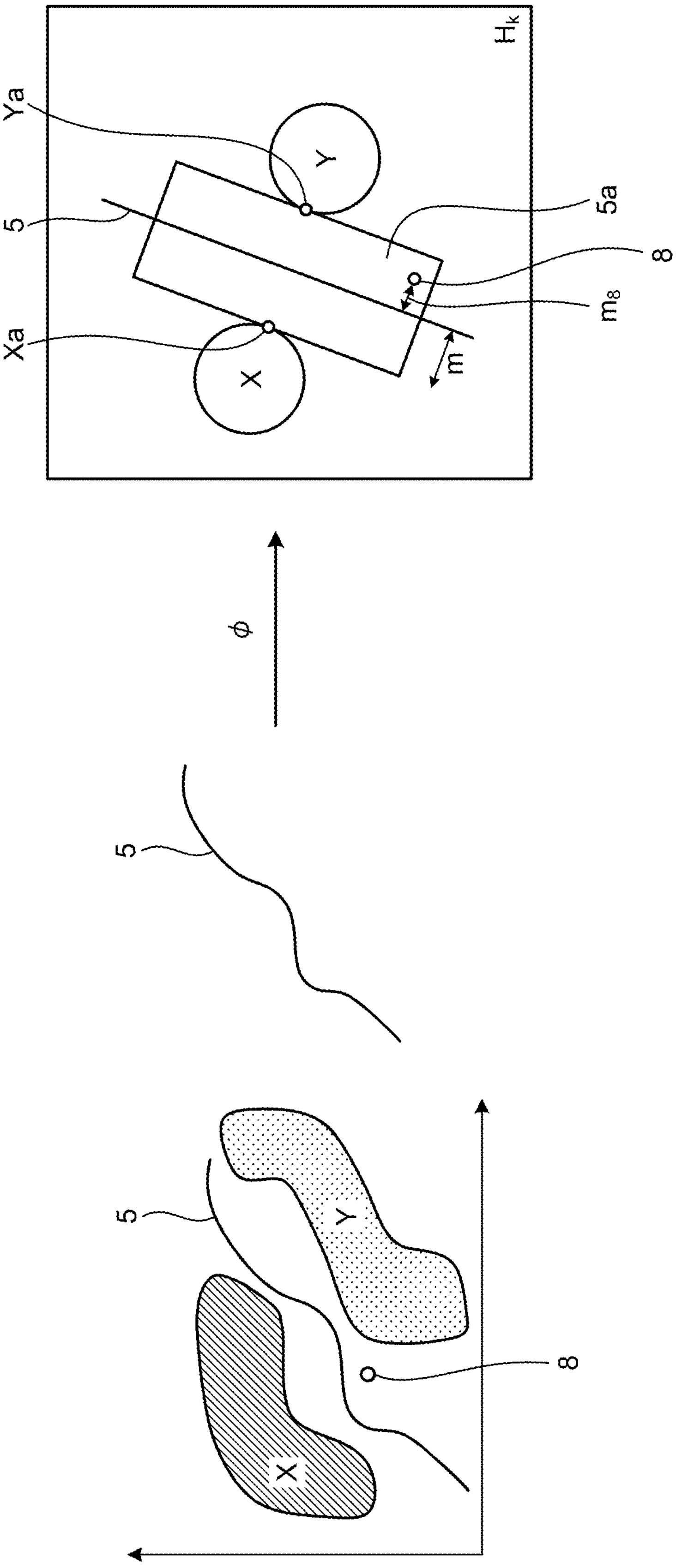
FIG. 6 is a diagram illustrating a calculation method of a critical area around the periphery of a decision boundary.

FIG. 6 is a diagram illustrating a technique for calculation a critical area around the periphery of the decision boundary. The computing system according to the first embodiment calculates the critical area 5*a* by projecting data (soft target) onto a high dimensional space (reproducing kernel Hilbert space) Hk in which the decision boundary 5 in the feature value space becomes a straight line. For example, if data 8 is input, the computing system constructs an inspector model that is used for calculating a distance (distance with the sign) ma between the decision boundary 5 in the high dimensional space Hk and the data 8. When the width of the critical area 5*a* is denoted by a width m, and if the distance ma is less than m, this indicates that the data 8 is included in the critical area 5*a*. Calculation of the distance (norm) is calculated from an inner product of the reproducing kernel Hilbert space and corresponds to the kernel trick. The distance (norm) is defined by Equation (1).

$$\|f\|=\sqrt{\langle f,f\rangle} \quad (1)$$

The computing system constructs the inspector model by using a hard-margin radial basis function (RBF) kernel support vector machine (SVM). The computing system projects a data space onto the reproducing kernel Hilbert space such that the decision boundary 5 becomes the straight line. The width m of the critical area 5*a* is sensitivity of detection related to accuracy degradation and is determined by the density of data in the vicinity of the decision boundary 5.

For example, the computing system classifies an area of the soft target into an area X and an area Y. The computing system projects the area X and the area Y onto the reproducing kernel Hilbert space, and specifies support vectors Xa and Ya that are closest to the decision boundary 5 side. The computing system specifies the decision boundary 5 such that a difference between the margin of the support vector Xa and the decision boundary 5 and the margin of the support vector Ya and the decision boundary 5 is the minimum. In other words, the computing system performs a process corresponding to curving the space located in the vicinity of the decision boundary in a Euclidean space while training alienation from the decision boundary 5 in the monitored machine learning model as a loss.

Here, a description will be given of an example of a process for detecting accuracy degradation of the machine learning model corresponding to the monitoring target that is performed by the computing system according to the first embodiment using the inspector model created by using the process described above. Furthermore, it is assumed that the machine learning model has been trained by a plurality of pieces of training data. In the description below, the plurality of pieces of training data are referred to as a "training data set".

The computing system inputs each of the pieces of training data included in the training data set to the inspector model and calculates a proportion of the training data included in the critical area 5*a* relative to all of the pieces of training data. In the description below, the proportion of the training data included in the critical area 5*a* relative to the pieces of training data is referred to as a "first proportion".

The computing system acquires an operation data set after elapse of time since the start of operation of the machine learning model. In the operation data set, a plurality of pieces of operation data are included. The computing system inputs each of the pieces of operation data included in the operation data set to the inspector model, and calculates a proportion of the operation data included in the critical area 5*a* relative to all of the pieces of operation data. In the description below, the proportion of the training data included in the critical area 5*a* relative to all of the pieces of operation data is referred to as a "second proportion".

The computing system compares the first proportion to the second proportion and detects accuracy degradation of the machine learning model in the case where the second proportion is increased or decreased. The state in which the second proportion is changed on the basis of the first proportion indicates that many pieces of operation data are included in the critical area 5*a* as compared to the start of operation, and indicates that concept drift occurs. The computing system acquires the operation data set in accordance with the lapse of time, and repeatedly performs the process described above. As a result, the computing system is able to create an inspector model that is usable for many purposes even in any classification algorithms, and is able to detect accuracy degradation of the machine learning model.

Figure 7:
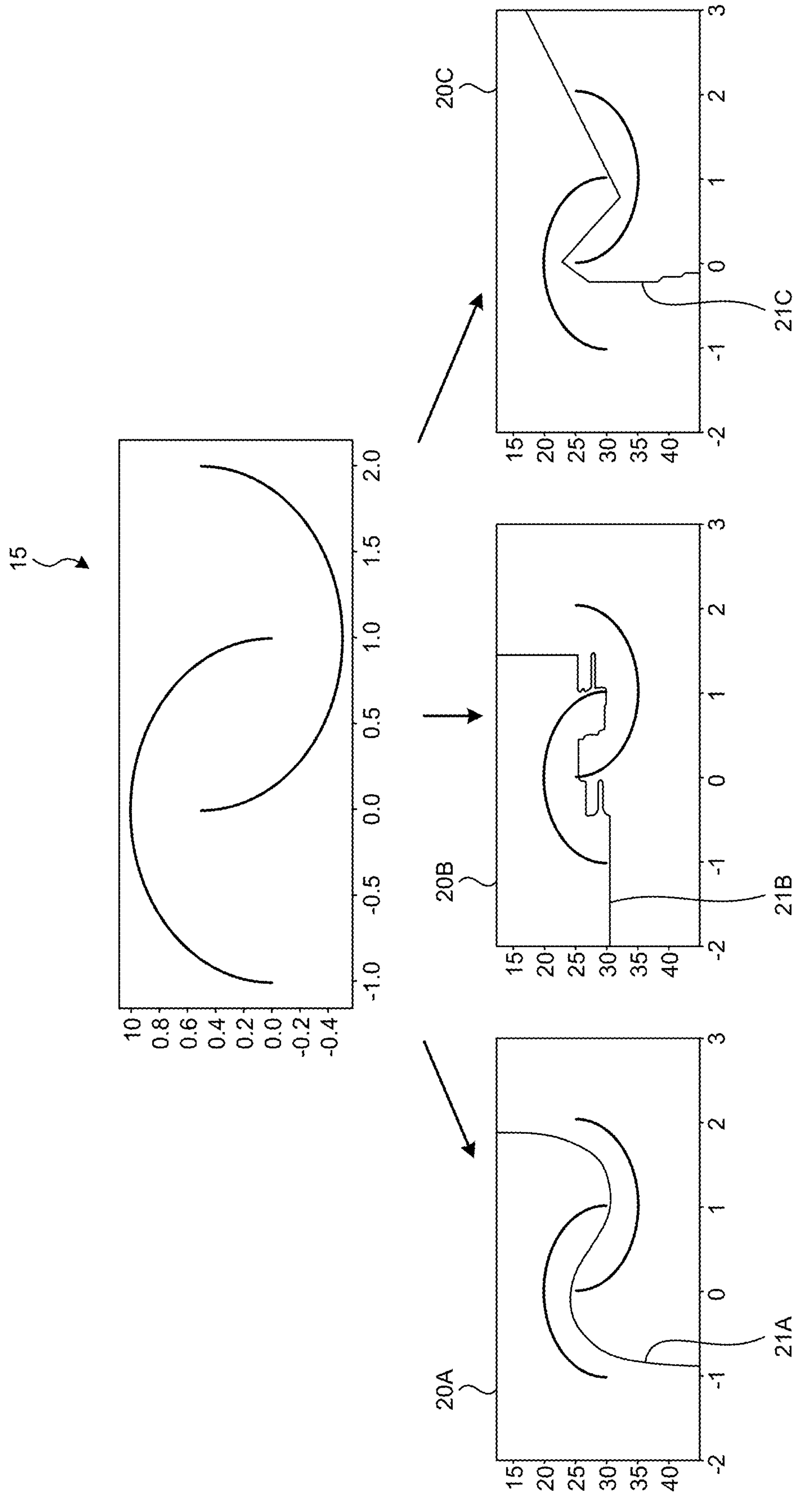
FIG. 7 is a diagram illustrating the property of a decision boundary in each of machine learning models.

In the following, the property of the decision boundary obtained in the case where the same training data set is input to each of a plurality of types of machine learning models will be described. FIG. 7 is a diagram illustrating the property of the decision boundary in each of the machine learning models. In the example illustrated in FIG. 7, each of support vector machine (Soft-Margin SVM), a random forest (Random Forest), and a NN is trained by using the training data set 15.

If so, a distribution obtained in the case where a data set is input to the trained support vector machine corresponds to a distribution 20A, and each of the pieces of data is classified as the first class or the second class at a decision boundary 21A. The distribution obtained in the case where a data set is input to the trained random forest corresponds to a distribution 20B, and each of the pieces of data is classified as the first class or the second class at a decision boundary 21B. The distribution obtained in the case where a data set is input to the trained NN corresponds to a distribution 20C, and each of the pieces of data is classified as the first class or the second class at a decision boundary 21C.

As illustrated in FIG. 7, even if training has been performed by using the same training data set 15, it is found that the property of the decision boundary is different depending on the type of the machine learning model.

In the following, an example of a decision boundary obtained in the case where an inspector model is created by knowledge distillation that uses each of the machine learning models will be described. For convenience of description, an inspector model created by knowledge distillation that uses a machine learning model (support vector machine) is referred to as a first inspector model. An inspector model created by knowledge distillation that uses a machine learning model (random forest) is referred to as a second inspector model. An inspector model created by knowledge distillation that uses a machine learning model (NN) is referred to as a third inspector model.

Figure 8:
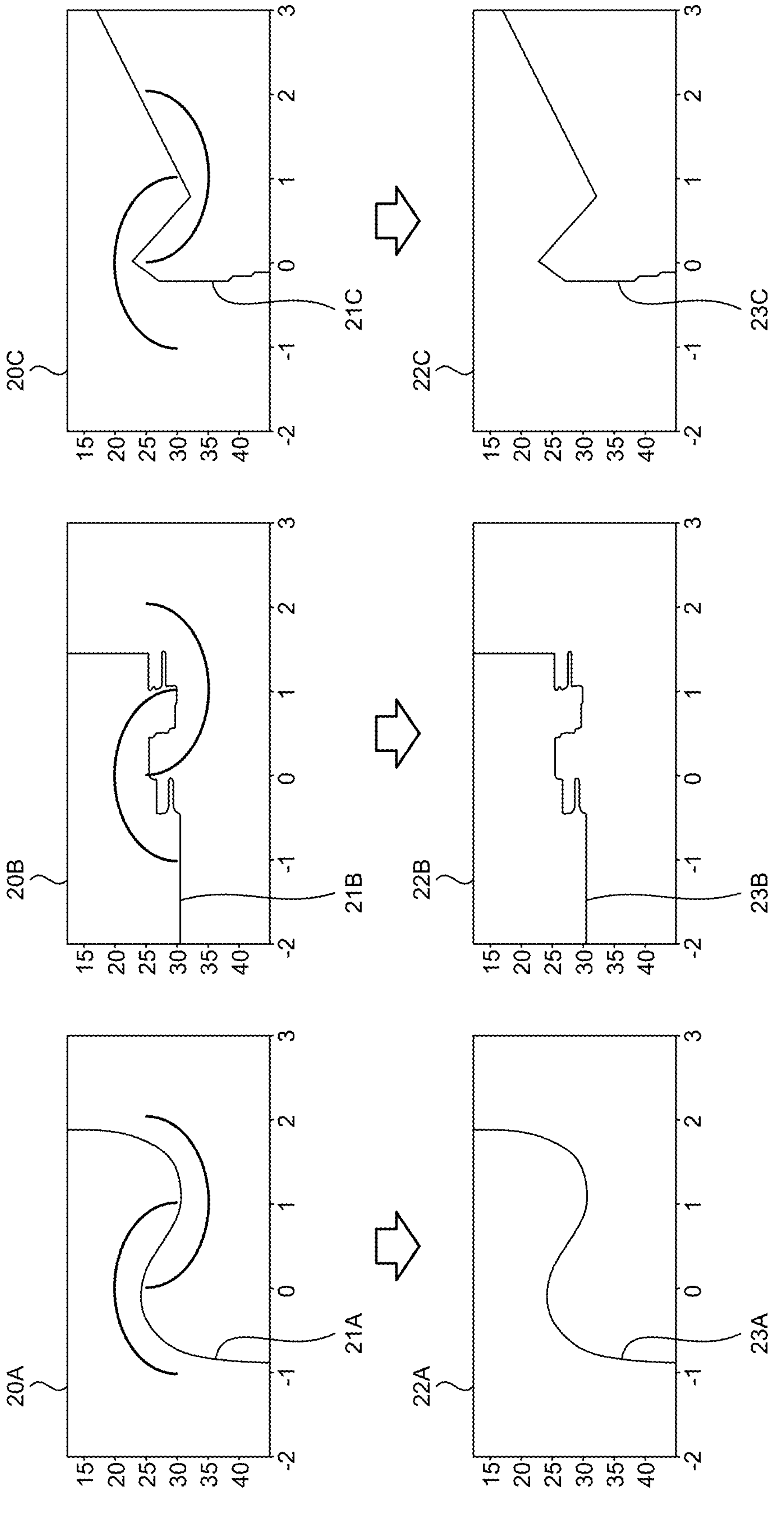
FIG. 8 is a diagram illustrating a visualized result of the decision boundary in each of the inspector models.

FIG. 8 is a diagram illustrating a visualized result of a decision boundary in each of the inspector model. When the computing system creates the first inspector model on the basis of the distribution 20A, the distribution of the first inspector model indicates a distribution denoted by 22A, and the decision boundary indicates a decision boundary 23A.

When the computing system creates the second inspector model on the basis of the distribution 20B, the distribution of the second inspector model indicates a distribution denoted by 22B, and the decision boundary indicates a decision boundary 23B. When the computing system creates the third inspector model on the basis of the distribution 20C, the distribution of the third inspector model indicates a distribution denoted by 22C, and the decision boundary indicates a decision boundary 23C.

Figure 9:
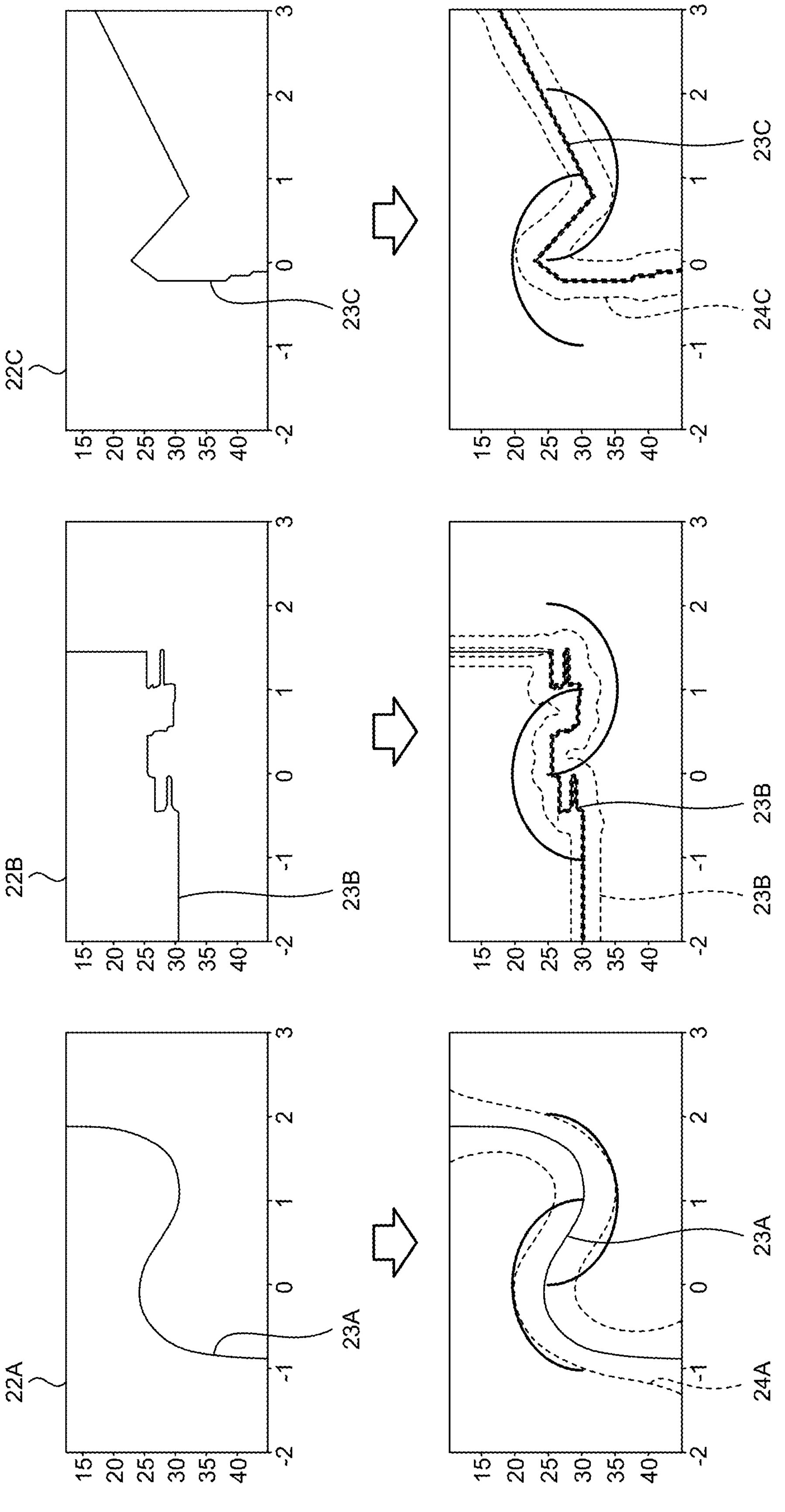
FIG. 9 is a diagram illustrating a visualized critical area obtained from each of the inspector models.

FIG. 9 is a diagram illustrating a visualized a critical area obtained by using each of the inspector models. The critical area based on the decision boundary 23A in the first inspector model corresponds to a critical area 24A. The critical area based on the decision boundary 23B in the second inspector model corresponds to a critical area 24B. The critical area based on the decision boundary 23C in the third inspector model corresponds to a critical area 24C.

Figure 10:
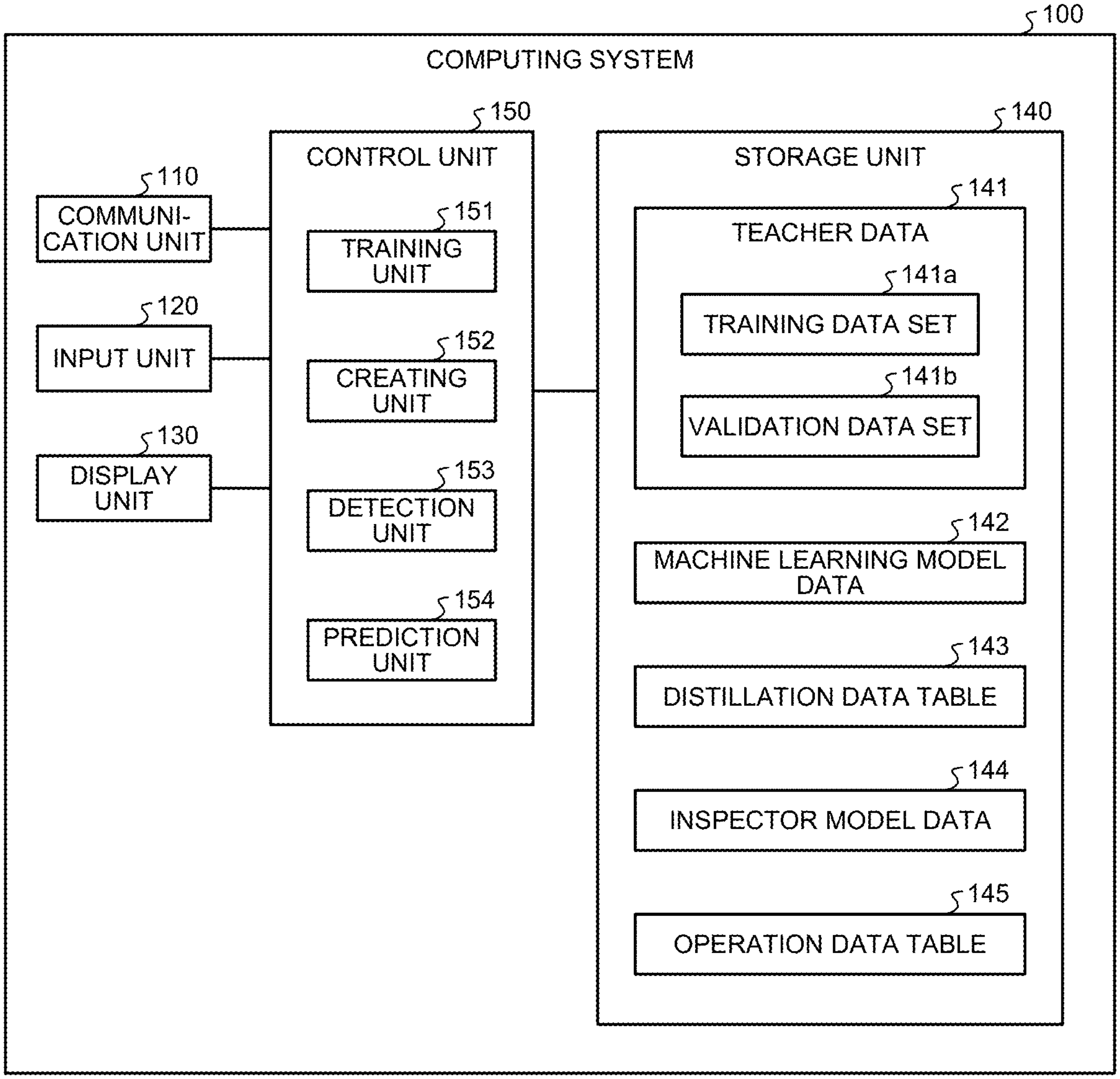
FIG. 10 is a functional block diagram illustrating a configuration of a computing system according to a first embodiment.

In the following, a configuration of the computing system according to the first embodiment will be described. FIG. 10 is a functional block diagram illustrating the configuration of the computing system according to the first embodiment. As illustrated in FIG. 10, a computing system 100 includes a communication unit 110, an input unit 120, a display unit 130, a storage unit 140, and a control unit 150.

The communication unit 110 is a processing unit that performs data communication with an external device (not illustrated) via a network. The communication unit 110 is an example of a communication device. The control unit 150, which will be described later, sends and receives data to and from the external device via the communication unit 110.

The input unit 120 is an input device for inputting various kinds of information to the computing system 100. The input unit 120 corresponds to a keyboard, a mouse, a touch panel, or the like.

The display unit 130 is a display device for displaying information that is output from the control unit 150. The display unit 130 corresponds to a liquid crystal display, an organic electro luminescence (EL) display, a touch panel, or the like.

The storage unit 140 includes teacher data 141, machine learning model data 142, a distillation data table 143, inspector model data 144, and an operation data table 145. The storage unit 140 corresponds to a semiconductor memory device, such as a random access memory (RAM) or a flash memory, or a storage device, such as a hard disk drive (HDD).

The teacher data 141 includes a training data set 141*a* and validation data 141*b*. The training data set 141*a* holds various kinds of information related to the training data.

Figures 11, 12:
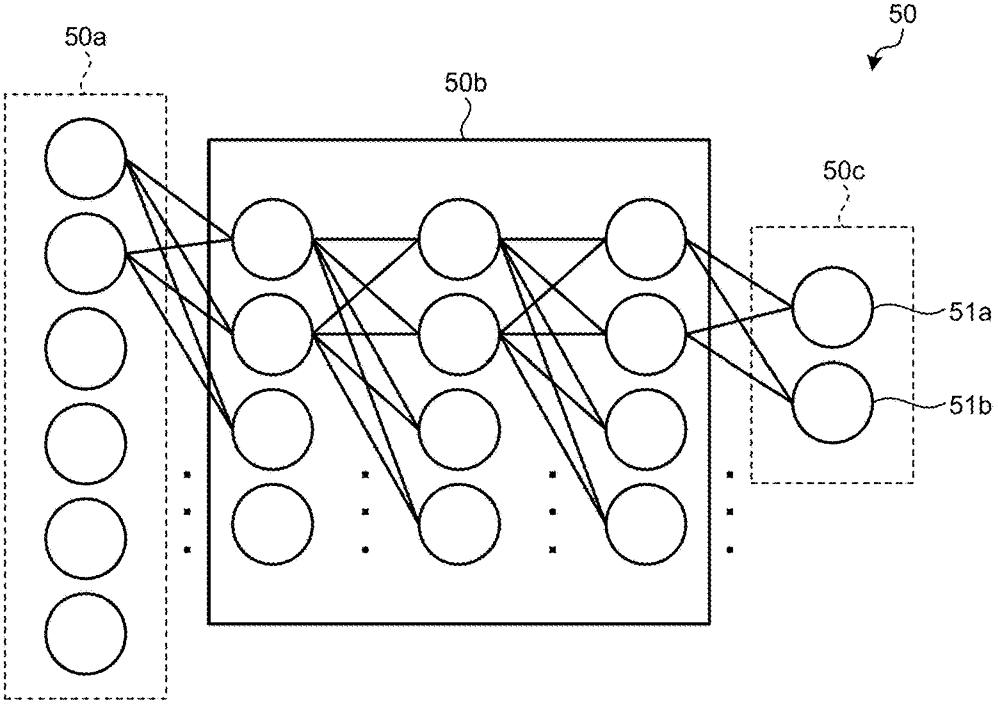
FIG. 11 is a diagram illustrating an example of a data structure of a training data set according to the first embodiment.
FIG. 12 is a diagram illustrating an example of a machine learning model according to the first embodiment.

FIG. 11 is a diagram illustrating an example of a data structure of the training data set according to the first embodiment. As illustrated in FIG. 11, the training data set associates a record number, training data, and a correct answer label with each other. The record number is a number for identifying a pair of the training data and the correct answer label. The training data corresponds to data on email spam, electricity demand prediction, stock price prediction, data on poker hands, image data, or the like. The correct answer label is information for uniquely identifying the first class or the second class.

The validation data 141*b* is data for validate the machine learning model trained by the training data set 141*a*. A correct answer label is given to the validation data 141*b*. For example, when the validation data 141*b* is input to the machine learning model, if an output result that is output from the machine learning model matches the correct answer label that is given to the validation data 141*b*, this state indicates that the machine learning model is appropriately trained by the training data set 141*a*.

The machine learning model data 142 is data in a machine learning model. The machine learning model according to the first embodiment is a machine learning model that classifies the input data into the first class or the second class using a predetermined classification algorithm. The classification algorithm may be any one of classification algorithms from among a NN, a random forest, the k-nearest neighbors algorithm, a support vector machine, and the like.

Here, as an example, the following description is given with the assumption that a NN is used as the machine learning model. FIG. 12 is a diagram illustrating an example of the machine learning model. As illustrated in FIG. 12, a machine learning model 50 has a structure of a neural network and includes an input layer 50*a*, a hidden layer 50*b*, and an output layer 50*c*. The input layer 50*a*, the hidden layer 50*b*, and the output layer 50*c* each have a structure in which a plurality of nodes are connected by edges. Each of the hidden layer 50*b* and the output layer 50*c* has a function called an activating function and a bias value, and an edge has a weight. In the description below, the bias value and the weight are referred to as "parameters".

If data (feature value of data) is input to each of the nodes that are included in the input layer 50*a*, a probability of each of the classes is output from nodes 51*a* and 51*b* included in the output layer 50*c* by way of the hidden layer 50*b*. For example, the probability of the first class is output from the node 51*a*. The probability of the second class is output from the node 51*b*.

The distillation data table 143 is a table that stores therein an output result (soft target) obtained in the case where each of the pieces of data included in a data set is input to the machine learning model 50. FIG. 13 is a diagram illustrating an example of a data structure of a distillation data table according to the first embodiment. As illustrated in FIG. 13, the distillation data table 143 associates a record number, input data, and a soft target with each other. The record number is a number for identifying a pair of input data and a soft target. The input data is data that is selected by a creating unit 152 on the basis of a decision boundary (feature space including the decision boundary) in the trained machine learning model 50.

The soft target is data that is output when the input data is input to the trained machine learning model 50. For example, it is assumed that the soft target according to the first embodiment indicates one of the classification classes between the first class and the second class.

The inspector model data 144 is data in the inspector model constructed by Hard-Margin RBF kernel SVM. In the description below, the Hard-Margin RBF kernel SVM is referred to as "kSVM". If data is input to the inspector model constructed in this way, a value of distance with the sign is output. For example, if the sign is positive, the input data is classified into the first class. If the sign is negative, the data is classified into the second class. The distance indicates a distance between the data and the decision boundary.

The operation data table 145 includes an operation data set that is added in accordance with elapsed time. FIG. 14 is a diagram illustrating an example of a data structure of the operation data table. As illustrated in FIG. 14, the operation data table 145 includes data identification information and an operation data set. The data identification information is information for identifying an operation data set. A plurality of pieces of operation data are included in the operation data set. The operation data corresponds to data on email spam, electricity demand prediction, stock price prediction, data on poker hands, image data, or the like.

A description will be given here by referring back to FIG. 10. The control unit 150 includes a training unit 151, the creating unit 152, a detection unit 153, and a prediction unit 154. The control unit 150 is able to be implemented by a central processing unit (CPU), a micro processing unit (MPU), or the like. Furthermore, the control unit 150 is also able to be implemented by hard wired logic, such as an application specific integrated circuit (ASIC) or a field programmable gate array (FPGA).

The training unit 151 is a processing unit that acquires the training data set 141*a* and that trains parameters of the machine learning model 50 on the basis of the training data set 141*a*. For example, if the training data included in the training data set 141*a* is input to the input layer held by the machine learning model 50, the training unit 151 updates (trains on the basis of a backpropagation algorithm) the parameters of the machine learning model 50 such that the output result of each of the nodes in the output layer approaches the correct answer label of the input training data. The training unit 151 repeatedly performs the process described above on each of the pieces of training data included in the training data set 141*a*. Furthermore, the training unit 151 may validate the machine learning model 50 by using the validation data 141*b*. The training unit 151 registers data (the machine learning model data 142) in the trained machine learning model 50 in the storage unit 140. The machine learning model 50 is an example of an "operation model".

Figure 15:
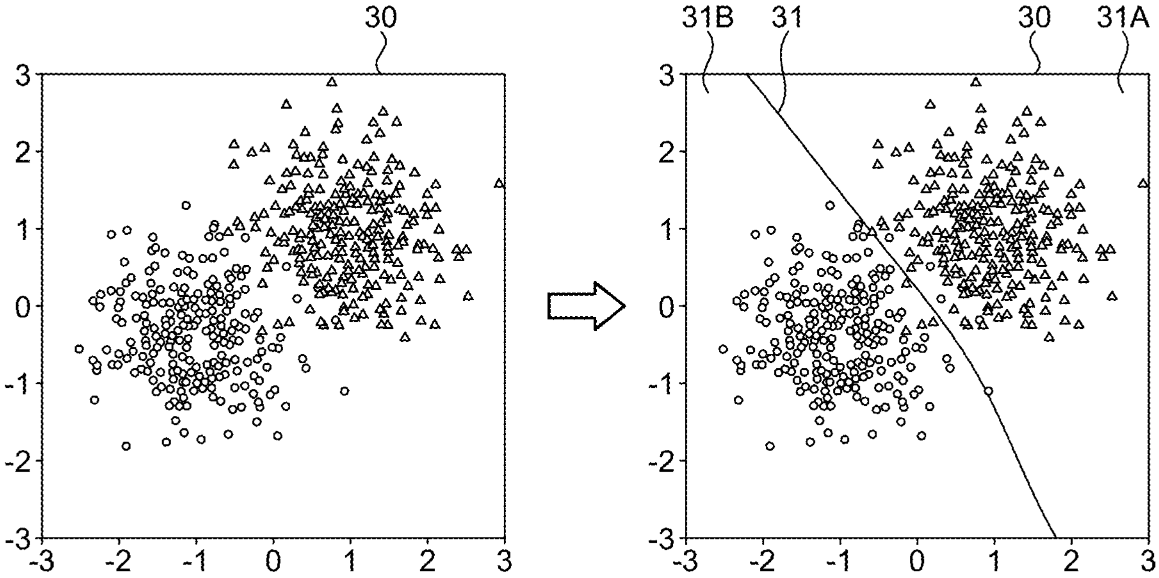
FIG. 15 is a diagram illustrating a decision boundary in a feature space according to the first embodiment.

FIG. 15 is a diagram illustrating a decision boundary in a feature space according to the first embodiment. A feature space 30 is obtained by visualizing each of the pieces of training data included in the training data set 141*a*. The horizontal axis of the feature space 30 corresponds to the axis of the first feature value, whereas the vertical axis corresponds to the axis of the second feature value. Here, for convenience of description, each of the pieces of training data is indicated by using two axes; however, it is assumed that the training data is multidimensional data. For example, the correct answer label associated with the training data indicated by a circle mark is defined as the "first class", whereas the correct answer label associated with the training data indicated by a triangle mark is defined as the "second class".

For example, if the machine learning model 50 is trained by using the training data set 141*a*, the feature space 30 is classified, by a decision boundary 31, into a model application area 31A and a model application area 31B. For example, in the case where the machine learning model 50 is a NN, if data is input to the machine learning model 50, the probability of the first class and the probability of the second class are output. If the probability of the first class is larger than that of the second class, the data is classified into the first class. If the probability of the second class is larger than that of the first class, the data is classified into the second class.

The creating unit 152 is a processing unit that creates an inspector model in which the decision boundary 31 between the model application area 31A and the model application area 31B has been trained on the basis of knowledge distillation of the machine learning model 50. If data (training data or operation data) is input to the inspector model, the distance (value of distance with the sign attached) between the decision boundary 31 and the data is output.

The creating unit 152 performs a process of generating the distillation data table 143 and a process of creating the inspector model data 144.

Figure 16:
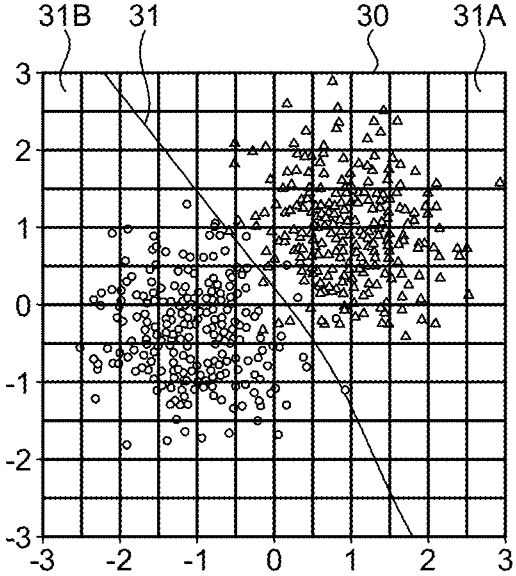
FIG. 16 is a diagram (1) illustrating a process performed by a creating unit.

In the following, the process of generating the distillation data table 143 performed by the creating unit 152 will be described. FIG. 16 is a diagram (1) illustrating the process performed by the creating unit. The creating unit 152 operates the machine learning model 50 by using the machine learning model data 142, and inputs each of the pieces of data in the feature space 30 to the machine learning model 50. As a result, the creating unit 152 specifies which piece of data in the feature space 30 is to be classified into the first class or classified in the second class. By performing this process, the creating unit 152 classifies the feature space into the model application area 31A and the model application area 31B, and specifies the decision boundary 31.

The creating unit 152 disposes, in the feature space 30, a plurality of vertical lines and the horizontal lines at predetermined intervals. The object obtained by disposing the vertical lines and the horizontal lines at predetermined intervals is referred to as a "grid". It is assumed that the width of the grid is previously set. The creating unit 152 selects the data located at the intersection coordinates on the grid and outputs the selected data to the machine learning model 50, thereby calculating a soft target associated with the selected data. The creating unit 152 associates the selected data (input data) with the soft target and registers the associated data in the distillation data table 143. The creating unit 152 also generates the distillation data table 143 by repeatedly performing the process described above on the data located at each of the intersection coordinates on the grid.

Figure 17:
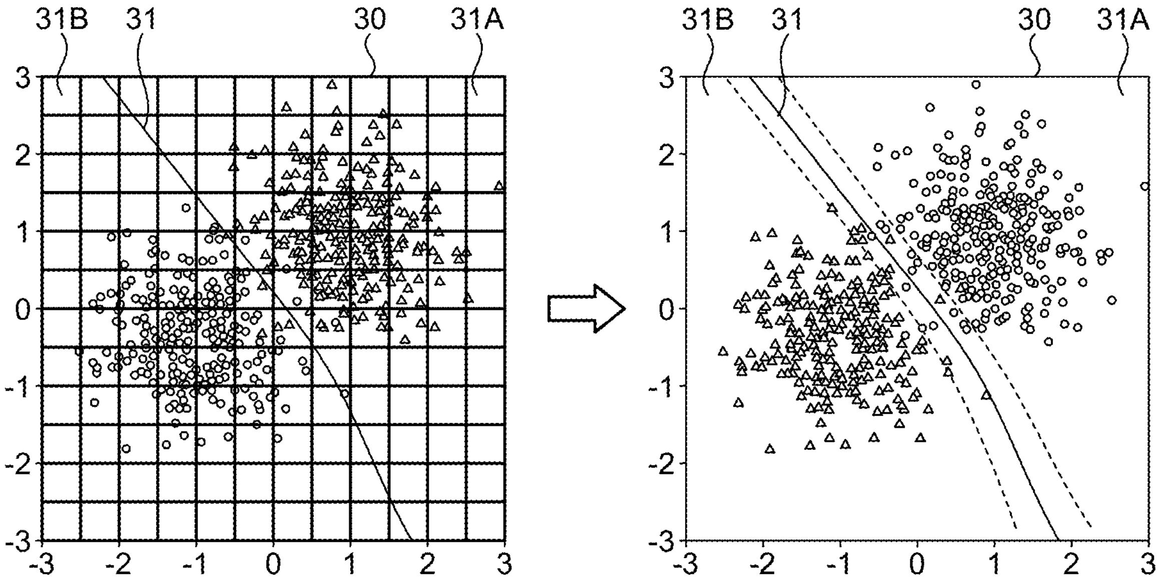
FIG. 17 is a diagram (2) illustrating a process performed by the creating unit.

In the following, a process of creating the inspector model data 144 performed by the creating unit 152 will be described. FIG. 17 is a diagram (2) illustrating a process performed by the creating unit. The creating unit 152 creates an inspector model 35 constructed by the kSVM on the basis of the relationship between the input data and the soft target registered in the distillation data table 143. The creating unit 152 registers the data (the inspector model data 144) on the created inspector model 35 into the storage unit 140.

For example, the creating unit 152 projects each of the pieces of input data stored in the distillation data table 143 onto the reproducing kernel Hilbert space. The creating unit 152 selects, as the first support vector, the input data that is the closest to the decision boundary 31 out of the pieces of input data classified into the first class included in the reproducing kernel Hilbert space. The creating unit 152 selects, as the second support vector, the input data that is the closest to the decision boundary 31 out of the pieces of input data classified into the second class included in the reproducing kernel Hilbert space. The creating unit 152 specifies the decision boundary 31 that passes through the midway point between the first support vector and the second support vector, thereby specifying a hyperparameter of the inspector model (kSVM). In the reproducing kernel Hilbert space, the decision boundary 31 becomes a straight line, and the area in which the distance from the decision boundary 31 denoted by m is set as a critical area 32. The distance m is the distance between the decision boundary 31 and the first support vector (the second support vector).

A description will be given here by referring back to FIG. 10. The detection unit 153 is a processing unit that detects accuracy degradation of the machine learning model 50 by operating the inspector model 35. The detection unit 153 inputs each of the pieces of training data included in the training data set 141*a* to the inspector model 35. If the detection unit 153 inputs the training data to the inspector model 35, the distance (norm) between the decision boundary 31 and the training data on the feature space is output.

If the distance between the decision boundary 31 and the training data is less than m, the detection unit 153 determines that the subject training data is included in the critical area 32. The detection unit 153 repeatedly performs the process described above on each of the pieces of training data included in the training data set 141*a*. The detection unit 153 calculates the proportion of the training data included in the critical area 32 to all of the pieces of training data as the "first proportion".

The detection unit 153 selects the operation data set stored in the operation data table 145 and inputs each of the pieces of operation data included in the operation data set to the inspector model 35. If the detection unit 153 inputs the operation data to the inspector model 35, the distance (norm) between the decision boundary 31 and the operation data in the feature space is output.

If the distance between the decision boundary 31 and the operation data is less than m, the detection unit 153 determines that the subject operation data is included in the critical area 32. The detection unit 153 repeatedly performs the process described above on each of the pieces of operation data included in the operation data set. The detection unit 153 calculates a proportion of the operation data included in the critical area 32 to all of the pieces of operation data as the "second proportion".

The detection unit 153 compares the first proportion to the second proportion, determines that concept drift occurs in the case where the second proportion is changed with respect to the first proportion, and then, detects accuracy degradation of the machine learning model 50. For example, the detection unit 153 determines that concept drift occurs in the case where the absolute value of the difference between the first proportion and the second proportion is larger than or equal to a threshold.

Figure 18:
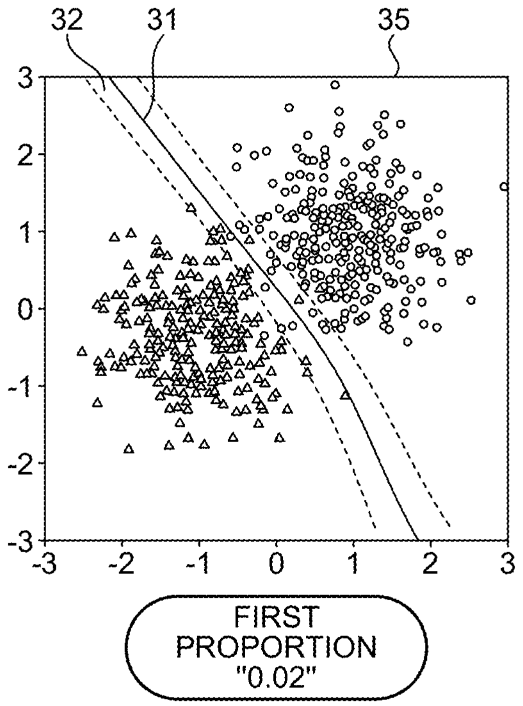
FIG. 18 is a diagram (1) illustrating a process performed by a detection unit according to the first embodiment.
Figure 19:
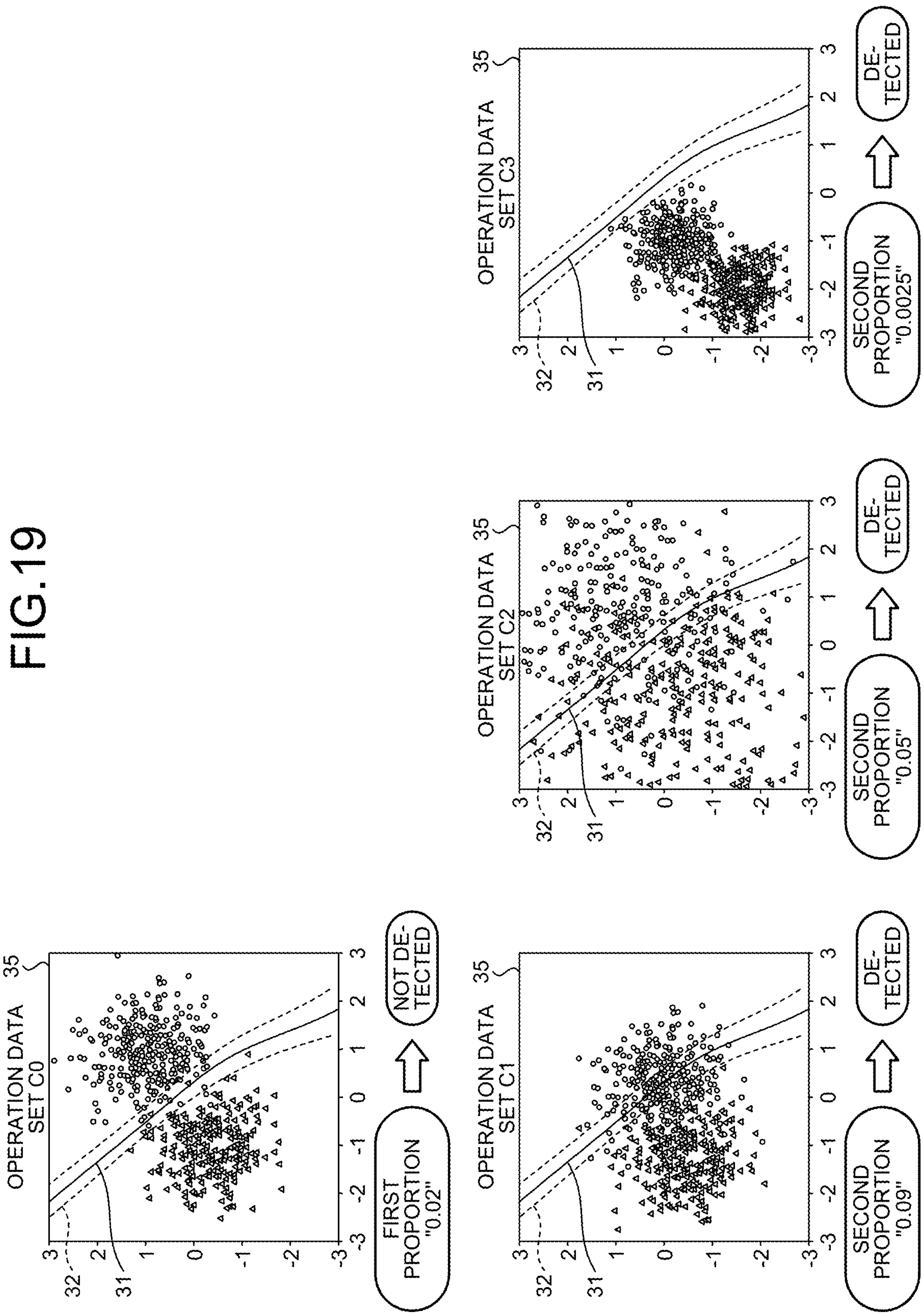
FIG. 19 is a diagram (2) illustrating a process performed by the detection unit according to the first embodiment.

FIG. 18 and FIG. 19 are diagrams each illustrating a process performed by the detection unit according to the first embodiment. FIG. 18 illustrates an example of the first proportion. For example, FIG. 18 indicates a case in which, when the detection unit 153 inputs each of the pieces of training data included in the training data set 141*a* to the inspector model 35, the first proportion indicates "0.02".

FIG. 19 illustrates an example of the second proportion. For example, if each of the pieces of operation data included in the operation data set C0 is input to the inspector model 35, the second proportion indicates "0.02". Since the first proportion and the second proportion of the operation data set C0 are the same, so that concept drift does not occur in the operation data set C0. As a result, the detection unit 153 does not detect accuracy degradation of the machine learning model 50 regarding the operation data set C0.

For example, if each of the pieces of operation data included in the operation data set C1 is input to the inspector model 35, the second proportion indicates "0.09". As compared to the first proportion, the second proportion of the operation data set C1 is increased, and concept drift occurs in the operation data set C1. As a result, the detection unit 153 detects accuracy degradation of the machine learning model 50 regarding the operation data set C1.

For example, if each of the pieces of operation data included in the operation data set C2 is input to the inspector model 35, the second proportion indicates "0.05". As compared to the first proportion, the second proportion of the operation data set C2 is increased, and concept drift occurs in the operation data set C2. As a result, the detection unit 153 detects accuracy degradation of the machine learning model 50 regarding the operation data set C2.

For example, if each of the pieces of operation data included in the operation data set C3 is input to the inspector model 35, the second proportion indicates "0.0025". As compared to the first proportion, the second proportion of the operation data set C3 is decreased, and concept drift occurs in the operation data set C3. As a result, the detection unit 153 detects accuracy degradation of the machine learning model 50 regarding the operation data set C3.

If the detection unit 153 detects accuracy degradation of the machine learning model 50, the detection unit 153 may display information indicating that the accuracy degradation has been detected on the display unit 130 or may notify an external device (not illustrated) of detection of the accuracy degradation. The detection unit 153 may output and display, onto the display unit 130, data identification information on the operation data set serving as a basis of detecting the accuracy degradation. Furthermore, the detection unit 153 may notify the training unit 151 of information indicating that accuracy degradation has been detected and retrain the machine learning model data 142. In this case, the training unit 151 retrains the machine learning model 50 by using a training data set that is newly designated.

If the detection unit 153 does not detect accuracy degradation of the machine learning model 50, the detection unit 153 outputs information indicating that accuracy degradation is not detected to the prediction unit 154.

The prediction unit 154 is a processing unit that operates the machine learning model 50 in the case where accuracy degradation of the machine learning model 50 is not detected, that inputs the operation data set, and that predicts a classification class of each of the pieces of operation data. The prediction unit 154 may output and display the prediction result onto the display unit 130, or may transmit the prediction result to an external device.

Figure 20:
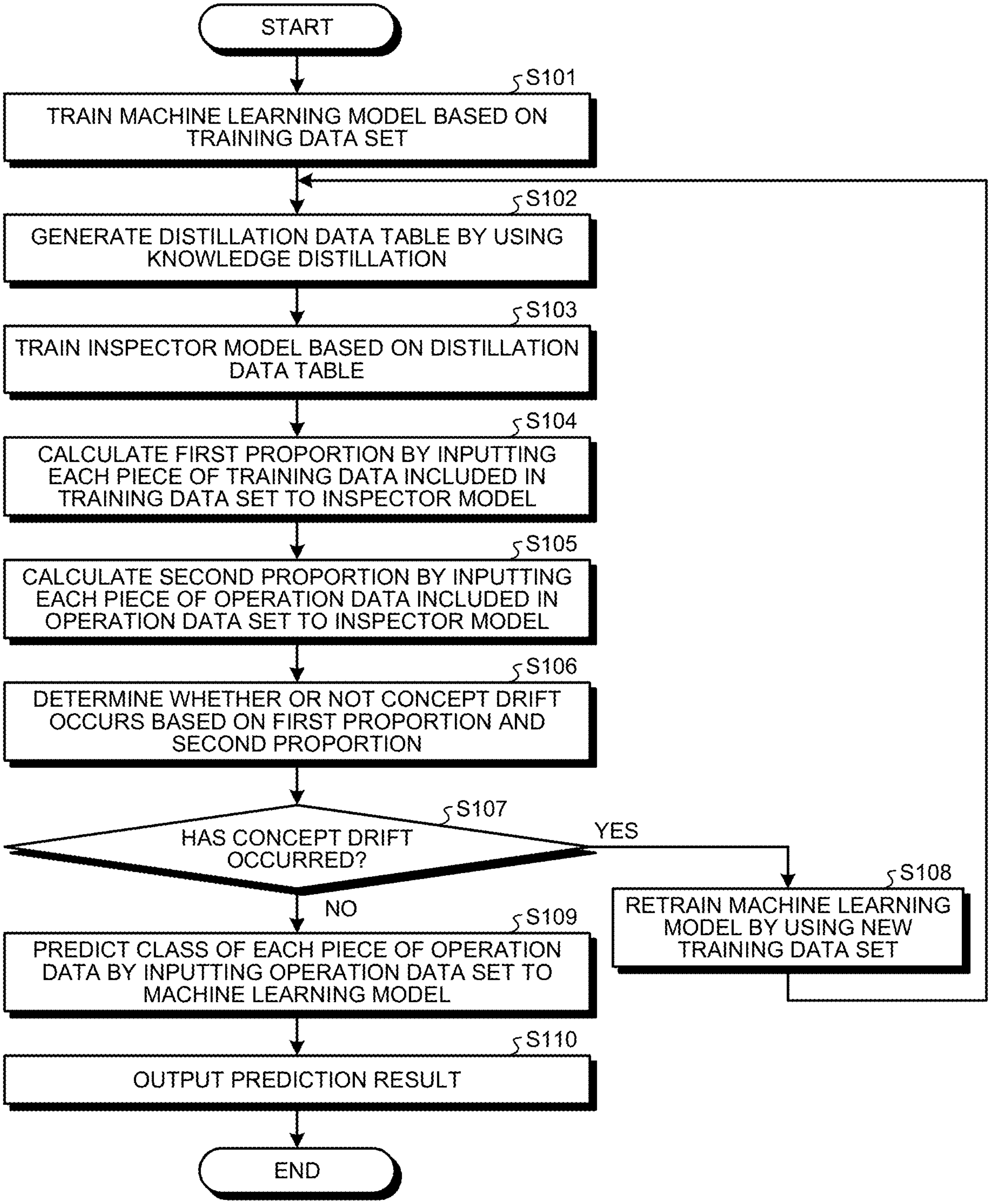
FIG. 20 is a flowchart illustrating the flow of a process performed by the computing system according to the first embodiment.

In the following, an example of the flow of the process performed by the computing system 100 according to the first embodiment will be described. FIG. 20 is a flowchart illustrating the flow of the process performed by the computing system according to the first embodiment. As illustrated in FIG. 20, the training unit 151 included in the computing system 100 trains the machine learning model 50 on the basis of the training data set 141*a* (Step S101).

The creating unit 152 included in the computing system 100 generates the distillation data table 143 by using knowledge distillation (Step S102). The creating unit 152 generates an inspector model on the basis of the distillation data table 143 (Step S103).

The detection unit 153 included in the computing system 100 inputs each of the pieces of training data included in the training data set 141*a* to the inspector model, and calculates the first proportion (Step S104). The computing system 100 inputs each of the pieces of operation data included in the operation data set to the inspector model, and calculates the second proportion (Step S105).

The detection unit 153 included in the computing system 100 determines whether or not concept drift occurs on the basis of the first proportion and the second proportion (Step S106). If concept drift occurs (Yes at Step S107), the computing system 100 proceeds to Step S108. In contrast, if concept drift does not occur (No at Step S107), the computing system 100 proceeds to Step S109.

The process at Step S108 and the subsequent processes will be described. The training unit 151 retrains the machine learning model 50 by using a new training data set (Step S108), and proceeds to Step S102.

The process at Step S109 and the subsequent processes will be described. The prediction unit 154 included in the computing system 100 inputs the operation data set to the machine learning model, and predicts a classification class of each of the pieces of operation data (Step S109). The prediction unit 154 outputs the prediction result (Step S110).

In the following, the effects of the computing system 100 according to the first embodiment will be described. The computing system 100 generates the machine learning model 50 on the basis of the training data set 141*a*, and then, creates an inspector model by using knowledge distillation. The computing system 100 calculates the first proportion that is obtained in the case where the training data set is input to the inspector model and the second proportion that is obtained in the case where the operation data set is input, and then, detects accuracy degradation of the machine learning model 50 on the basis of the first proportion and the second proportion. As a result, it is possible to detect accuracy degradation of the machine learning model.

The computing system 100 compares the first proportion to the second proportion and detects, if the second proportion is increased or decreased, accuracy degradation of the machine learning model. The state in which the second proportion has been changed based on the first proportion indicates that a large amount of operation data is included in the critical area as compared to the state at the time of the start of operation and indicates that concept drift occurs. The computing system 100 acquires the operation data set in accordance with elapsed time, and repeatedly performs the process described above. As a result, it is possible to create an inspector model that is usable for many purposes even in any classification algorithm and it is thus possible to detect accuracy degradation of the machine learning model.

For example, the computing system 100 according to the first embodiment constructs an inspector model (kernel SVM) on the basis of knowledge distillation using the machine learning model 50; therefore, as described above with reference to FIG. 7 to FIG. 9, it is possible to create an inspector model that is usable for many purposes even in any classification algorithm.

A computing system according to a second embodiment detects accuracy degradation of a machine learning model that corresponds to a monitoring target by performing, for each classification class, one to many distillation on three or more types of classification classes. Furthermore, if the computing system detects accuracy degradation, the computing system specifies which classification class is affected.

Figure 21:
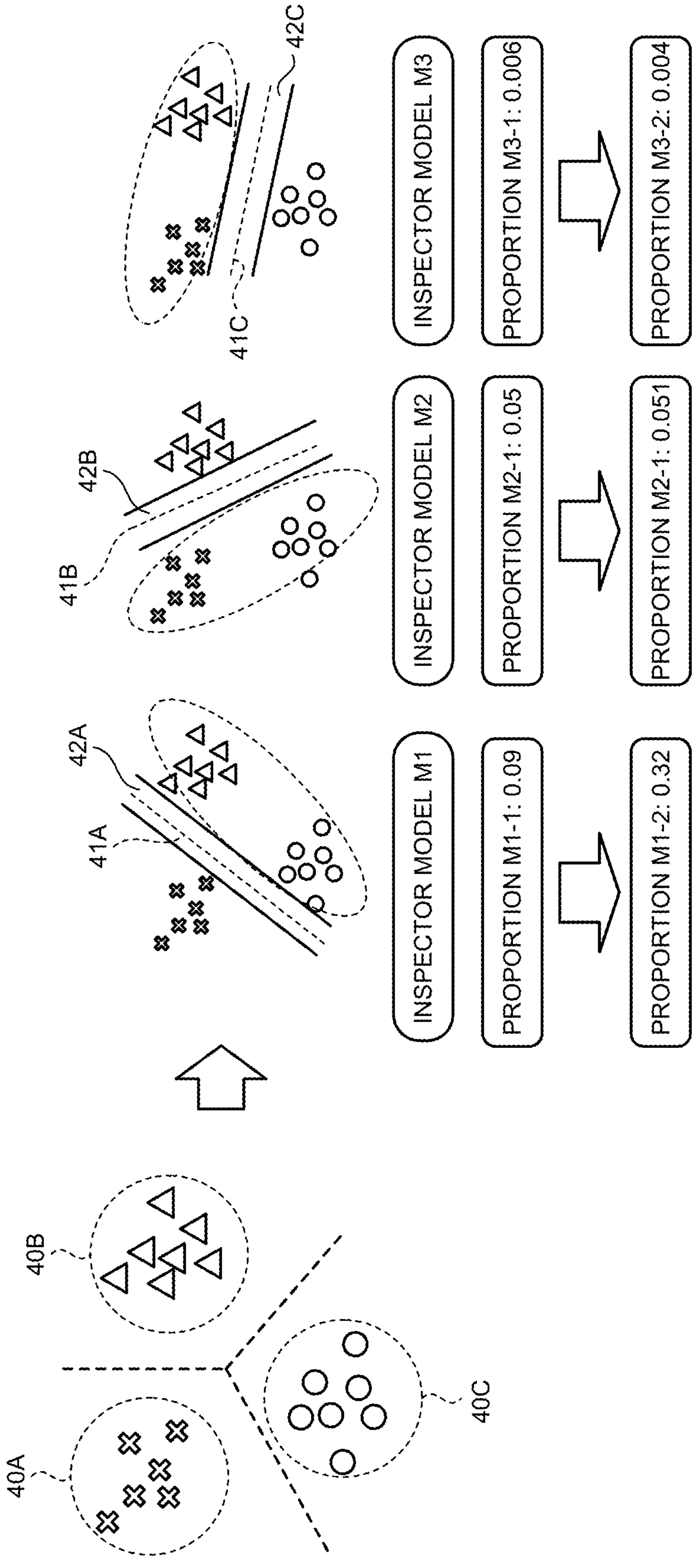
FIG. 21 is a diagram illustrating a process performed by a computing system according to a second embodiment.

FIG. 21 is a diagram illustrating a process performed by the computing system according to the second embodiment. In the second embodiment, a description will be given by using a first training data set 40A associated with the first class, a second training data set 40B associated with the second class, and a third training data set 40C associated with the third class.

Here, the plurality of pieces of first training data included in the first training data set 40A are indicated by cross marks. The plurality of pieces of second training data included in the second training data set 40B are indicated by triangle marks. The plurality of pieces of third training data included in the third training data set 40C are indicated by circle marks.

The computing system creates, by using knowledge distillation, an inspector model M1 in which a decision boundary 41A between "the first training data set 40A" and "the second training data set 40B and the second training data set 40B" has been trained. In the inspector model M1, a critical area 42A around the periphery of the decision boundary 41A is set.

The computing system creates, by using knowledge distillation, an inspector model M2 in which a decision boundary 41B between "the second training data set 40B" and "the first training data set 40A and the third training data set 40C" has been trained. In the inspector model M2, a critical area 42B around the periphery of the decision boundary 41B is set.

The computing system creates, by using knowledge distillation, an inspector model M3 in which a decision boundary 41C between "the third training data set 40C" and "the first training data set 40A and the second training data set 40B" has been trained. In the inspector model M3, a critical area 42C around the periphery of the decision boundary 41C is set.

The computing system calculates each of the first proportion and the second proportion related to each of the inspector models M1, M2, and M3. In the description below, the first proportion calculated by using the inspector model M1 is referred to as a "proportion M1-1", and the second proportion calculated by using the inspector model M1 is referred to as a "proportion M1-2". The first proportion calculated by using the inspector model M2 is referred to as a "proportion M2-1", and the second proportion calculated by using the inspector model M2 is referred to as a "proportion M2-2". The first proportion calculated by using the inspector model M3 is referred to as a "proportion M3-1", and the second proportion calculated by using the inspector model M3 is referred to as a "proportion M3-2".

For example, the proportion M1-1 indicates the proportion of the training data included in the critical area 42A out of all of the pieces of training data in the case where the first, the second, and the third training data sets are input to the inspector model M1. The proportion M1-2 indicates the proportion of the operation data included in the critical area 42A out of all of the pieces of operation data in the case where the operation data set is input to the inspector model M1.

The proportion M2-1 indicates the proportion of the training data included in the critical area 42B out of all of the pieces of training data in the case where the first, the second, and the third training data sets are input to the inspector model M2. The proportion M2-2 indicates the proportion of the operation data included in the critical area 42B out of all of the pieces of operation data in the case where the operation data set is input to the inspector model M2.

The proportion M3-1 indicates the proportion of the training data included in the critical area 42C out of all of the pieces of training data in the case where the first, the second, and the third training data sets are input to the inspector model M3. The proportion M3-2 indicates the proportion of the operation data included in the critical area 42C out of all of the pieces of operation data in the case where the operation data set is input to the inspector model M3.

If a difference (absolute value of a difference) between the first proportion and the second proportion is larger than or equal to a threshold, the computing system detects accuracy degradation of the machine learning model that corresponds to the monitoring target. Furthermore, the computing system specifies, on the basis of a pair of the first proportion and the second proportion having a largest difference, a classification class that corresponds to a cause of accuracy degradation. It is assumed that the threshold is set in advance. In the description given with reference to FIG. 21, the threshold is defined to be "0.1".

Specifically, if the absolute value of a difference between the proportion M1-1 and the proportion M1-2 is larger than or equal to the threshold, the computing system determines that the first class is a cause of accuracy degradation. If the absolute value of a difference between the proportion M2-1 and the proportion M2-2 is larger than or equal to the threshold, the computing system determines that the second class is a cause of accuracy degradation. If the absolute value of a difference between the proportion M3-1 and the proportion M3-2 is larger than or equal to the threshold, the computing system determines that the third class is a cause of the accuracy degradation.

For example, if the proportion M1-1 is 0.09 and the proportion M1-2 is 0.32, the absolute value of the difference between the proportion M1-1 and the proportion M1-2 is "0.23" and is larger than or equal to the threshold. If the proportion M2-1 is 0.05 and the proportion M2-2 is 0.051, the absolute value of the difference between the proportion M2-1 and the proportion M2-2 is "0.001" and is less than the threshold. If the proportion M3-1 is 0.006 and the proportion M3-2 is 0.004, the absolute value of the difference between the proportion M3-1 and the proportion M3-2 is "0.002" and is less than the threshold. In this case, the computing system detects concept drift of the operation data set, and determines that the cause of the accuracy degradation is the first class.

In this way, the computing system according to the second embodiment detects accuracy degradation of the machine learning model corresponding to the monitoring target by performing, for each classification class, one to many distillation on three or more types of classification classes. Furthermore, if the computing system detects accuracy degradation, the computing system is able to specify which of the classification classes is affected by comparing the first proportion to the second proportion of the inspector models M1 to M3.

Figure 22:
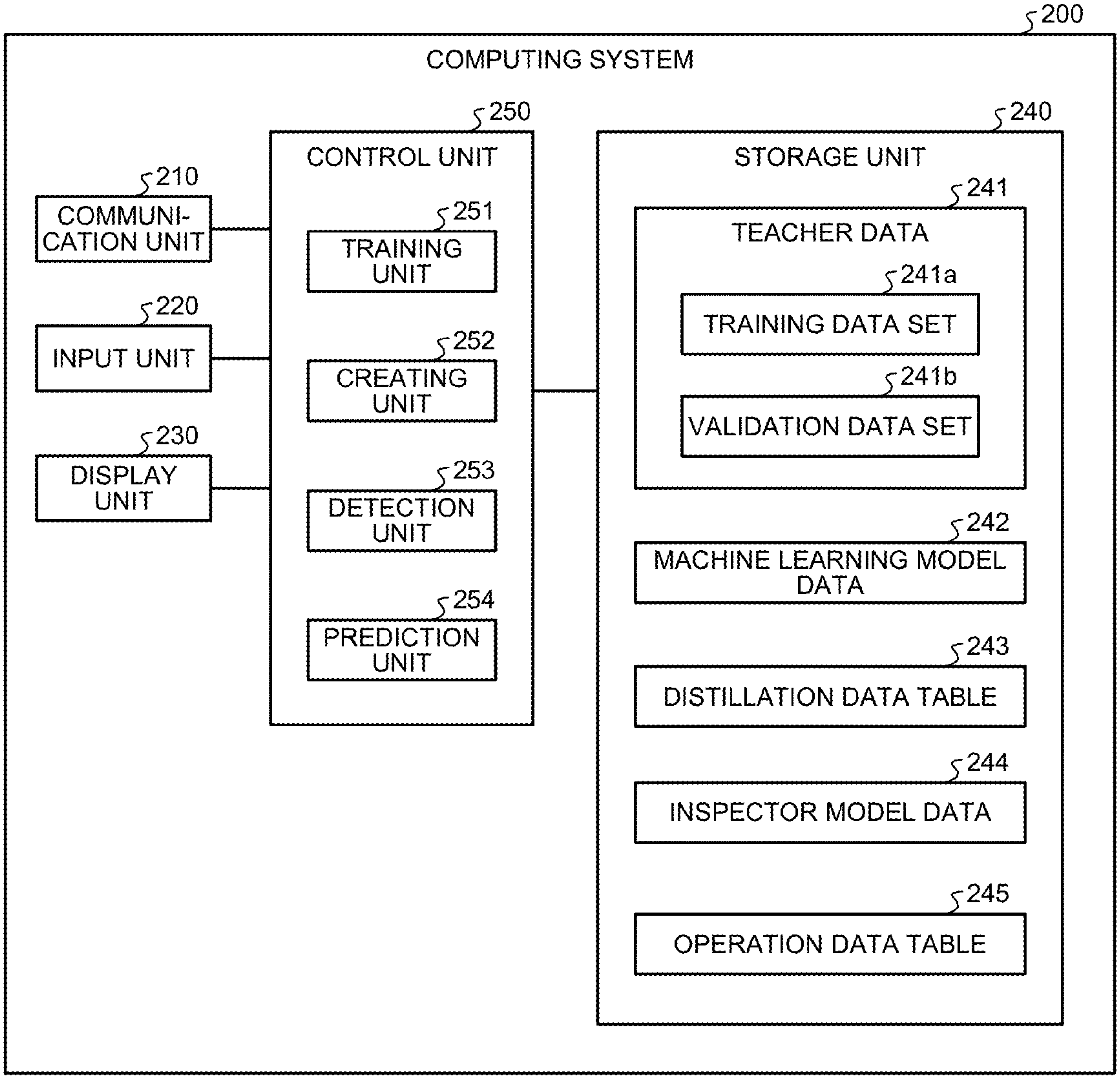
FIG. 22 is a functional block diagram illustrating a configuration of the computing system according to the second embodiment.

In the following, a configuration of the computing system according to the second embodiment will be described. FIG. 22 is a functional block diagram illustrating a configuration of the computing system according to the second embodiment. As illustrated in FIG. 22, a computing system 200 includes a communication unit 210, an input unit 220, a display unit 230, a storage unit 240, and a control unit 250.

The communication unit 210 is a processing unit that performs data communication with an external device (not illustrated) via a network. The communication unit 210 is an example of a communication device. The control unit 250, which will be described later, sends and receives data to and from the external device via the communication unit 110.

The input unit 220 is an input device for inputting various kinds of information to the computing system 200. The input unit 220 corresponds to a keyboard, a mouse, a touch panel, or the like.

The display unit 230 is a display device that displays information that is output from the control unit 250. The display unit 230 corresponds to a liquid crystal display, an organic EL display, a touch panel, or the like.

The storage unit 240 includes teacher data 241, machine learning model data 242, a distillation data table 243, an inspector model table 244, and an operation data table 245. The storage unit 140 corresponds to a semiconductor memory device, such as a RAM or a flash memory, or a storage device, such as an HDD.

The teacher data 241 includes a training data set 241*a* and a validation data 241*b*. The training data set 241*a* holds various kinds of information related to the training data.

FIG. 23 is a diagram illustrating an example of a data structure of the training data set according to the second embodiment. As illustrated in FIG. 23, the training data set associates a record number, training data, and a correct answer label with each other. The record number is a number for identifying a pair of the training data and the correct answer label. The training data corresponds to data on email spam, electricity demand prediction, stock price prediction, data on poker hands, image data, or the like. The correct answer label is information for uniquely identifying the first class or the second class. In the second embodiment, as a correct answer label, one of the first class, the second class, and the third class is associated with the training data.

The validation data 241*b* is data for validating the machine learning model that is trained by the training data set 241*a*. Other explanations of the validation data 241*b* are the same as those of the validation data 141*b* described above in the first embodiment.

The machine learning model data 242 is data in the machine learning model. The machine learning model according to the second embodiment is a machine learning model that classifies, by using a predetermined classification algorithm, input data into one of the first class, the second class, and the third class. The classification algorithm may be any one of classification algorithms from among a NN, a random forest, the k-nearest neighbors algorithm, a support vector machine, and the like.

In the second embodiment, the following description is given with the assumption that a NN is used as a machine learning model. FIG. 24 is a diagram illustrating an example of a machine learning model according to the second embodiment. As illustrated in FIG. 24, a machine learning model 55 has a structure of a neural network and includes the input layer 50*a*, the hidden layer 50*b*, and the output layer 50*c*. The input layer 50*a*, the hidden layer 50*b*, and the output layer 50*c* each have a structure in which a plurality of nodes are connected by edges. Each of the hidden layer 50*b* and the output layer 50*c* has a function called an activating function and a bias value, and an edge has a weight. In the description below, the bias value and the weight are referred to as "parameters".

In the machine learning model 55, the input layer 50*a* and the hidden layer 50*b* are the same as those in the machine learning model 50 described above with reference to FIG. 12. Regarding the machine learning model 55, a probability of each of the classes is output from the nodes 51*a*, 51*b*, and 51*c* included in the output layer 50*c*. For example, the probability of the first class is output from the node 51*a*. The probability of the second class is output from the node 51*b*. The probability of the third class is output from the node 51*c*.

The distillation data table 243 is a table that stores therein an output result in the case where each of the pieces of data of a data set is input to the machine learning model 55. The data structure of the distillation data table is the same as the data structure of the distillation data table 143 described above in the first embodiment. Furthermore, it is assumed that the soft target included in the distillation data table 243 indicates one of the classification classes out of the first class, the second class, and the third class.

The inspector model table 244 is a table that stores therein data in the inspector models M1, M2, and M3 constructed by using the kSVM. If data is input each of the inspector models M1, M2, and M3, a value of a distance with the sign is output.

When data is input to the inspector model M1, if the sign is positive, the input data is classified into the first class. If the sign is negative, the data is classified into the second class or the third class.

When data is input to the inspector model M2, if the sign is positive, the input data is classified into the second class. If the sign is negative, the data is classified into the first class or the third class.

When data is input to the inspector model M3, if the sign is positive, the input data is classified into the third class. If the sign is negative, the data is classified into the first class or the second class.

The operation data table 245 includes an operation data set that is added in accordance with elapsed time. The data structure of the operation data table 245 is the same as the data structure of the operation data table 145 described above in the first embodiment.

A description will be given here by referring back to FIG. 22. The control unit 250 includes a training unit 251, a creating unit 252, a detection unit 253, and a prediction unit 254. The control unit 250 is able to be implemented by a CPU, a MPU, or the like. Furthermore, the control unit 250 may also be implemented by hard-wired logic, such as an ASIC or an FPGA.

The training unit 251 is a processing unit that acquires the training data set 241*a* and that trains parameters of the machine learning model 55 on the basis of the training data set 241*a*. For example, if the training unit 251 inputs the training data included in the training data set 241*a* to the input layer held by the machine learning model 55, the training unit 251 updates (trains on the basis of a backpropagation algorithm) the parameters of the machine learning model 55 such that the output result of each of the nodes in the output layer approaches the correct answer label of the input training data. The training unit 251 repeatedly performs the process described above on each of the pieces of training data included in the training data set 241*a*. Furthermore, the training unit 251 may validate the machine learning model 55 by using the validation data 241*b*. The training unit 251 registers data (the machine learning model data 242) in the trained machine learning model 55 into the storage unit 240. The machine learning model 55 is an example of an "operation model".

Figure 25:
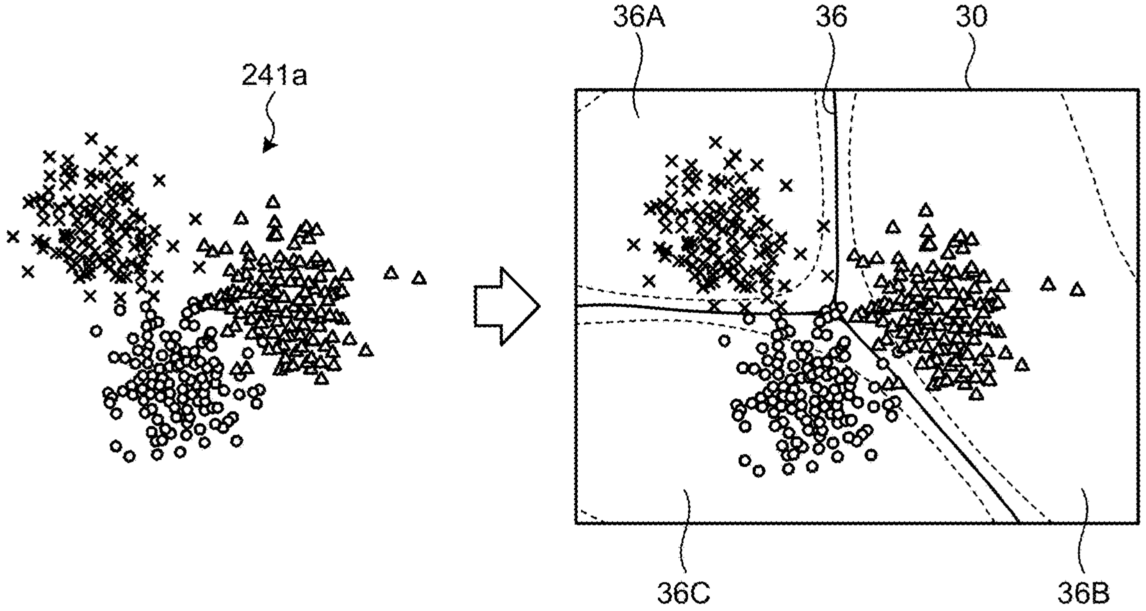
FIG. 25 is a diagram illustrating a decision boundary in a feature space according to the second embodiment.

FIG. 25 is a diagram illustrating a decision boundary of a feature space according to the second embodiment. The feature space 30 is obtained by visualizing each of the pieces of training data included in the training data set 241*a*. The horizontal axis of the feature space 30 corresponds to the axis of the first feature value, whereas the vertical axis corresponds to the axis of the second feature value. Here, for convenience of description, each of the pieces of training data is indicated by using two axes; however, it is assumed that the training data is multidimensional data. For example, the correct answer label associated with the training data indicated by the cross mark is defined as the "first class", the correct answer label associated with the training data indicated by the triangle mark is defined as the "second class", and the correct answer label associated with the training data indicated by the circle mark is defined as the "third class".

For example, if the machine learning model 55 is trained by using the training data set 241*a*, the feature space 30 is classified, by a decision boundary 36, into a model application area 36A, a model application area 36B, and a model application area 36C. For example, in the case where the machine learning model 55 is a NN, if data is input to the machine learning model 55, each of the probability of the first class, the probability of the second class, and the probability of the third class is output. If the probability of the first class is larger than that of the other classes, the data is classified into the first class. If the probability of the second class is larger than that of the other classes, the data is classified into the second class. If the probability of the third class is larger than that of the other classes, the data is classified into the third class.

The creating unit 252 is a processing unit that creates the inspector models M1, M2, and M3 on the basis of knowledge distillation of the machine learning model 55. For example, the creating unit 252 creates the inspector model M1 in which a decision boundary (corresponding to the decision boundary 41A illustrated in FIG. 21) between the "model application area 36A" and the "model application areas 36B and 36C" has been trained. If data (training data or operation data) is input to the created inspector model M1, the distance (value of the distance with the sign) between the decision boundary 41A and the data is output.

The creating unit 252 creates the inspector model M2 in which the decision boundary (corresponding to the decision boundary 41B illustrated in FIG. 21) between the "model application area 36B" and the "model application areas 36A and 36C" has been trained. If data (training data or operation data) is input to the created inspector model M2, the distance (value of the distance with the sign) between the decision boundary 41B and the data is output.

The creating unit 252 creates the inspector model M3 in which the decision boundary (corresponding to the decision boundary 41C illustrated in FIG. 21) between the "model application area 36C" and the "model application areas 36A and 36B" has been trained. If data (training data or operation data) is input to the created inspector model M3, the distance (value of the distance with the sign) between the decision boundary 41C and the data is output.

Figure 26:
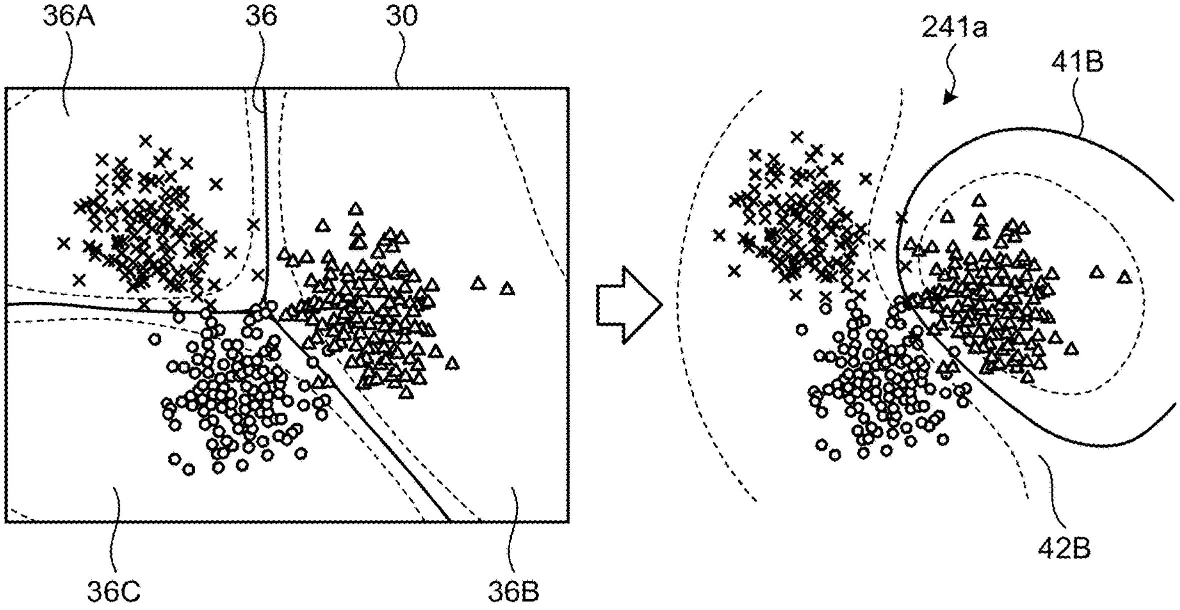
FIG. 26 is a diagram illustrating an example of a decision boundary and a critical area in an inspector model.

FIG. 26 is a diagram illustrating an example of the decision boundary and the critical area included in the inspector model. FIG. 26 illustrates, as an example, the decision boundary and the critical area 42B included in the inspector model M2. Illustrations of the decision boundary and the critical area related to the inspector models M1 and M3 are omitted.

The creating unit 252 performs a process of generating the distillation data table 243 and a process of creating the inspector model table 244.

First, a process of generating the distillation data table 243 performed by the creating unit 252 will be described. The creating unit 252 operates the machine learning model 55 by using the machine learning model data 242, and inputs each of the pieces of data in the feature space to the machine learning model 55. As a result, the creating unit 252 specifies which piece of data in the feature space is to be classified into one of the classification classes of the first class, the second class, and the third class. By performing this process, the creating unit 252 classifies the feature space into the model application area 36A, the model application area 36B, and the model application area 36C, and specifies the decision boundary 36.

The creating unit 252 disposes a "grid" in the feature space 30. It is assumed that the width of the grid is set in advance. The creating unit 252 selects the data located at the intersection coordinates on the grid and outputs the selected data to the machine learning model 55, thereby calculating a soft target associated with the data. The creating unit 252 associates the selected data (input data) with the soft target and registers the associated data into the distillation data table 243. The creating unit 252 also generates the distillation data table 243 by repeatedly performing the process described above on the pieces of data that are located at the respective intersection coordinates on the grid.

In the following, a process of creating the inspector model table 244 performed by the creating unit 252 will be described. The creating unit 252 creates, on the basis of the relationship between the input data and the soft target registered in the distillation data table 243, the inspector models M1 to M3 that are constructed by the kSVM. The creating unit 252 registers the data on the created inspector models M1 to M3 into the inspector model table 244.

An example of a process of creating the "inspector model M1" performed by the creating unit 252 will be described. The creating unit 252 projects each of the pieces of input data stored in the distillation data table 243 onto the reproducing kernel Hilbert space. The creating unit 252 selects, as the first support vector, the input data that is the closest to the decision boundary 41A out of the pieces of input data classified into the first class included in the reproducing kernel Hilbert space. The creating unit 152 selects, as the second support vector, the input data that is the closest to the decision boundary 41A out of the pieces of input data classified into the second class or the third class included in the reproducing kernel Hilbert space. The creating unit 252 specifies the decision boundary 41A that passes through the midway point between the first support vector and the second support vector, thereby specifying a hyperparameter of the inspector model M1. In the reproducing kernel Hilbert space, the decision boundary 41A becomes a straight line, and the area in which the distance from the decision boundary 41A denoted by $m_{M1}$ is set as the critical area 42A. The distance $m_{M1}$ is the distance between the decision boundary 41A and the first support vector (the second support vector).

An example of a process of creating the "inspector model M2" performed by the creating unit 252 will be described. The creating unit 252 projects each of the pieces of input data stored in the distillation data table 243 onto the reproducing kernel Hilbert space. The creating unit 252 selects, as the third support vector, the input data that is the closest to the decision boundary 41B out of the pieces of input data classified into the second class included in the reproducing kernel Hilbert space. The creating unit 252 selects, as the fourth support vector, the input data that is the closest to the decision boundary 41B out of the pieces of input data classified into the first class or the third class included in the reproducing kernel Hilbert space. The creating unit 252 specifies the decision boundary 41B that passes through the midway point between the third support vector and the fourth support vector, thereby specifying a hyperparameter of the inspector model M2. In the reproducing kernel Hilbert space, the decision boundary 41B becomes a straight line, and the area in which the distance from the decision boundary 41B is denoted by $m_{M2}$ is set as the critical area 42B. The distance $m_{M2}$ is the distance between the decision boundary 41B and the third support vector (the fourth support vector).

An example of a process of creating the "inspector model M3" performed by the creating unit 252 will be described. The creating unit 252 projects each of the pieces of input data stored in the distillation data table 243 onto the reproducing kernel Hilbert space. The creating unit 252 selects, as the fifth support vector, the input data that is the closest to the decision boundary 41C out of the pieces of input data classified into the third class included in the reproducing kernel Hilbert space. The creating unit 252 selects, as the sixth support vector, the input data that is the closest to the decision boundary 41C out of the pieces of the input data classified into the first class or the second class included in the reproducing kernel Hilbert space. The creating unit 252 specifies the decision boundary 41C that passes through the midway point between the fifth support vector and the sixth support vector, thereby specifying a hyperparameter of the inspector model M3. In the reproducing kernel Hilbert space, the decision boundary 41C becomes a straight line, and the area in which the distance from the decision boundary 41C is denoted by $m_{M3}$ as the critical area 42C. The distance $m_{M3}$ is the distance between the decision boundary 41C and the fifth support vector (the sixth support vector).

The detection unit 253 is a processing unit that operates the inspector models M1 to M3 and that detects accuracy degradation of the machine learning model 55. Furthermore, if the detection unit 253 detects accuracy degradation of the machine learning model 55, the detection unit 253 specifies classification class that corresponds to a cause of accuracy degradation.

The detection unit 253 calculates each of the first proportions (the proportion M1-1, the proportion M2-1, and the proportion M3-1) by inputting the training data set 241*a* to each of the inspector models M1 to M3.

If the detection unit 253 inputs the training data to the inspector model M1, the distance between the decision boundary 41A and the training data in the feature space is output. If the distance between the decision boundary 41A and the training data is less than the distance $m_{M1}$, the detection unit 253 determines that the subject training data is included in the critical area 42A. The detection unit 253 repeatedly performs the process described above on each of the pieces of training data, specifies the number of pieces of training data included in the critical area 42A out of all of the pieces of training data, and calculates the proportion M1-1.

If the detection unit 253 inputs the training data to the inspector model M2, the distance between the decision boundary 41B and the training data in the feature space is output. If the distance between the decision boundary 41B and training data is less than the distance $m_{M2}$, the detection unit 253 determines that the subject training data is included in the critical area 42B. The detection unit 253 repeatedly performs the process described above on each of the pieces of training data, specifies the number of pieces of training data included in the critical area 42B out of all of the pieces of training data, and calculates the proportion M2-1.

If the detection unit 253 inputs the training data to the inspector model M3, the distance between the decision boundary 41C and the training data in the feature space is output. If the distance between the decision boundary 41C and the training data is less than the distance $m_{M3}$, the detection unit 253 determines that the subject training data is included in the critical area 42C. The detection unit 253 repeatedly performs the process described above on each of the pieces of training data, specifies the number of pieces of training data included in the critical area 42C out of all of the pieces of training data, and calculates the proportion M3-1.

The detection unit 253 calculates each of the second proportions (the proportion M1-2, the proportion M2-2, and the proportion M3-2) by inputting the operation data set to each of the inspector models M1 to M3.

If the detection unit 253 inputs the operation data to the inspector model M1, the distance between the decision boundary 41A and the operation data in the feature space is output. If the distance between the decision boundary 41A and the training data is less than the distance $m_{M1}$, the detection unit 253 determines that the subject operation data is included in the critical area 42A. The detection unit 253 repeatedly performs the process described above on each of the pieces of operation data, specifies the number of pieces of operation data included in the critical area 42A out of all of the pieces of operation data, and calculates the proportion M1-2.

If the detection unit 253 inputs the operation data to the inspector model M2, the distance between the decision boundary 41B and the operation data in the feature space is output. If the distance between the decision boundary 41B and the operation data is less than the distance $m_{M2}$, the detection unit 253 determines that the subject operation data is included in the critical area 42B. The detection unit 253 repeatedly performs the process described above on each of the pieces of operation data, specifies the number of pieces of operation data included in the critical area 42B out of all of the pieces of operation data, and calculates the proportion M2-1.

If the detection unit 253 inputs the operation data to the inspector model M3, the distance between the decision boundary 41C and the operation data in the feature space is output. If the distance between the decision boundary 41C and the operation data is less than the distance $m_{M3}$, the detection unit 253 determines that the subject operation data is included in the critical area 42C. The detection unit 253 repeatedly performs the process described above on each of the pieces of operation data, specifies the number of pieces of operation data included in the critical area 42C out of all of the pieces of operation data, and calculates the proportion M3-1.

The detection unit 253 compares the first proportion with the second proportion that are associated with each other, determines, if the second proportion is changed with respect to the first proportion, that concept drift occurs, and detects accuracy degradation of the machine learning model 55. For example, if the absolute value of the difference between the first proportion and the second proportion is larger than or equal to the threshold, the detection unit 253 determines that concept drift occurs.

Here, a pair of the first proportion and the second proportion that are associated with each other is defined to be a pair of the proportion M1-1 and the proportion M1-2, a pair of the proportion M2-1 and the proportion M2-2, and a pair of the proportion M3-1 and the proportion M3-2.

Furthermore, if the absolute value of the difference between the proportion M1-1 and the proportion M1-2 is larger than or equal to the threshold, the detection unit 253 determines that the class corresponding to a cause of accuracy degradation is the "first class". If the absolute value of the difference between the proportion M2-1 and the proportion M2-2 is larger than or equal to the threshold, the detection unit 253 determines that the class corresponding to a cause of accuracy degradation is the "second class". If the absolute value of the difference between the proportion M3-1 and the proportion M3-2 is larger than or equal to the threshold, the detection unit 253 determines that the class corresponding to a cause of accuracy degradation is the "third class".

If the detection unit 253 detects accuracy degradation of the machine learning model 55 by performing the process described above, the detection unit 253 outputs and displays, onto the display unit 230, information indicating that accuracy degradation has been detected and information on the classification class corresponding to the cause of the accuracy degradation. Furthermore, the detection unit 253 may transmit, to an external device, information indicating that accuracy degradation has been detected and information on the classification class corresponding to the cause of the accuracy degradation.

If the detection unit 253 does not detect accuracy degradation of the machine learning model 55, the detection unit 253 outputs, to the prediction unit 254, information indicating that accuracy degradation is not detected.

The prediction unit 254 is a processing unit that inputs, if accuracy degradation of the machine learning model 55 is not detected, the operation data set by operating the machine learning model 55 and that predicts the classification class of each of the pieces of operation data. The prediction unit 254 may output and display the prediction result onto the display unit 230, or may transmit the prediction result to an external device.

Figure 27:
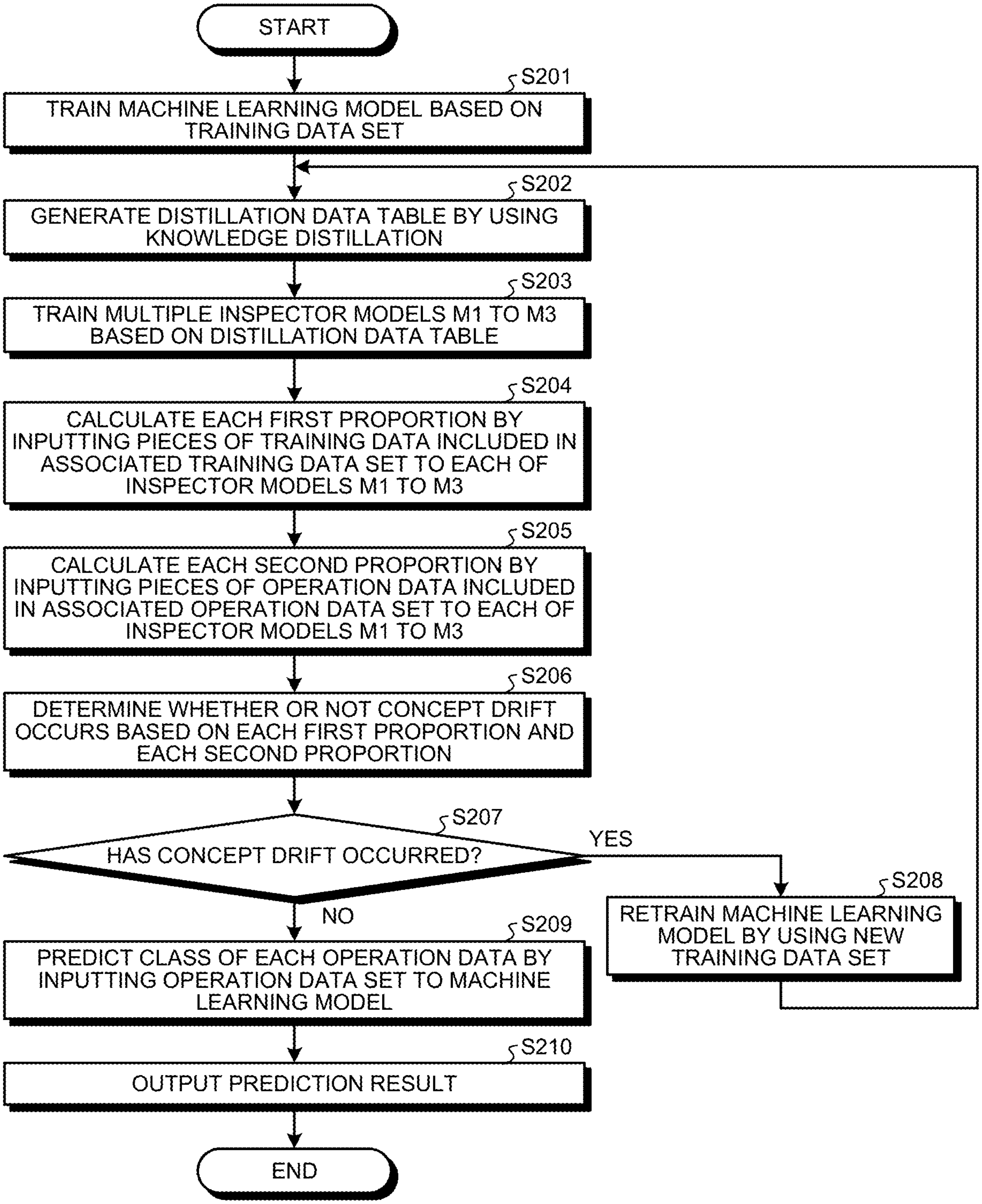
FIG. 27 is a flowchart illustrating the flow of a process performed by the computing system according to the second embodiment.

In the following, an example of the flow of a process performed by the computing system 200 according to the second embodiment will be described. FIG. 27 is a flowchart illustrating the flow of a process performed by the computing system according to the second embodiment. As illustrated in FIG. 27, the training unit 251 included in the computing system 200 trains the machine learning model 55 on the basis of the training data set 241*a* (Step S201).

The creating unit 252 included in the computing system 200 generates the distillation data table 243 by using knowledge distillation (Step S202). The creating unit 252 included in the computing system 200 creates the plurality of inspector models M1 to M3 on the basis of the distillation data table 243 (Step S203).

The detection unit 253 included in the computing system 200 inputs each of the pieces of training data included in the training data set to each of the inspector models M1 to M3, and calculates each of the first proportions (the proportion M1-1, the proportion M2-1, and the proportion M3-1) (Step S204).

The detection unit 253 inputs each of the pieces of operation data included in the operation data set to each of the inspector models M1 to M3, and calculates each of the second proportions (the proportion M1-2, the proportion M2-2, and the proportion M3-2) (Step S205).

The detection unit 253 determines whether concept drift has occurred on the basis of each of the first proportions and each of the second proportions (Step S206). If concept drift has occurred (Yes at Step S207), the computing system 200 proceeds to Step S208. In contrast, if concept drift does not occur (No at Step S207), the computing system 200 proceeds to Step S209.

The process at Step S208 and the subsequent processes will be described. The training unit 251 retrains the machine learning model 55 by using a new training data set (Step S208), and proceeds to Step S202.

The process at Step S209 and the subsequent processes will be described. The prediction unit 254 included in the computing system 200 inputs the operation data set to the machine learning model 55, and predicts the classification class of each of the pieces of operation data (Step S209). The prediction unit 254 outputs the prediction result (Step S210).

In the following, the effects of the computing system 200 according to the second embodiment will be described. The computing system 200 detects accuracy degradation of the machine learning model that corresponds to the monitoring target by performing, for each classification class, one to many distillation on three or more types of classification classes. Furthermore, if the computing system 200 detects accuracy degradation, the computing system 200 is able to specify which of the classification classes is affected.

For example, if the number of classification classes is larger than or equal to three, it is not possible to specify the direction of concept drift of the operation data by using only the distance from the decision boundary. In contrast, by creating the classification models (the plurality of inspector models M1 to M3) used for one to many classes, it is possible to specify the direction in which concept drift has occurred, and specify which of the classification classes is affected.

A computing system according to a third embodiment determines, for each piece of operation data included in an operation data set, whether or not concept drift (a cause of accuracy degradation) occurs. In the description below, a piece of data (training data or operation data) included in a data set is referred to as an "instance".

Figure 28:
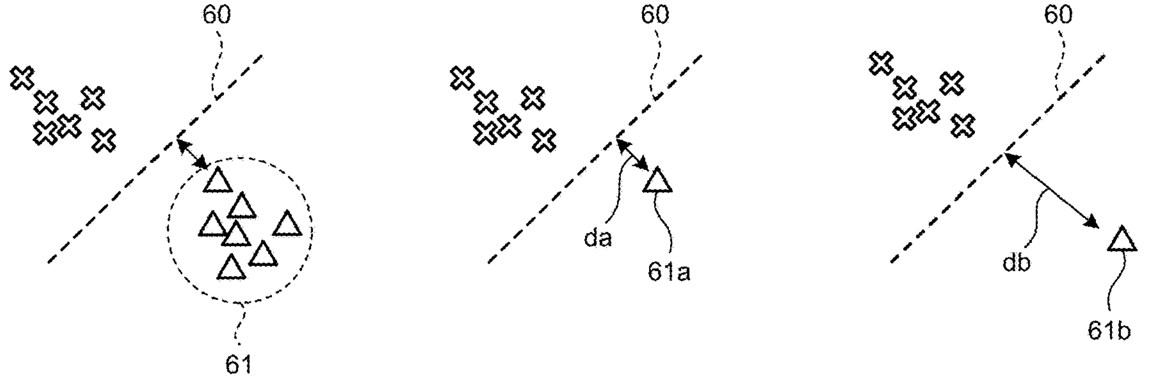
FIG. 28 is a diagram illustrating a process performed by a computing system according to a third embodiment.

FIG. 28 is a diagram illustrating a process performed by the computing system according to the third embodiment. The computing system according to the third embodiment creates an inspector model by using knowledge distillation similarly to the computing system 100 according to the first embodiment. The decision boundary trained by using the inspector model is defined as a decision boundary 60. The computing system detects data as an instance that corresponds to the cause of accuracy degradation on the basis of the distance between an instance in the feature space and the decision boundary 60.

For example, in FIG. 28, a certainty factor is different in each of the instances that are included in an operation data set 61. For example, the distance between an instance 61*a* and the decision boundary 60 is denoted by da. The distance between an instance 61*b* and the decision boundary 60 is denoted by db. The distance da is smaller than the distance db, so that the instance 61*a* is more likely to be a cause of accuracy degradation than the instance 61*b*.

Here, the distance between the decision boundary and the instance is a scalar value, and the magnitude thereof varies for each operation data set, so that it is difficult to set a threshold that is used to specify a distance from the decision boundary that corresponds to a dangerous level. Consequently, the computing system converts the distance from the decision boundary to a probability value and handles the converted probability value to a certainty factor. As a result, the certainty factor takes a value of "0 to 1" regardless of the operation data set.

For example, the computing system calculates a certainty factor on the basis of Equation (2). The example indicated by Equation (2) indicates the probability that a certain instance is the first class. The feature value of the instance is denoted by "x", and the distance between the decision boundary and the instance is denoted by "f(x)". "A" and "B" are hyperparameters that are trained from the training data set.

$$P(y=1|x)=1/(1+\exp(Af(x)+B)) \tag{2}$$

The computing system calculates a certainty factor of the instance included in the operation data set on the basis of Equation (2), and specifies, if the certainty factor is less than the threshold that is set in advance, the instance as a cause of accuracy degradation. As a result, it is possible to calculate the certainty factor within the range of "0 to 1" regardless of the operation data set, and appropriately specify the instance that corresponds to the cause of accuracy degradation.

Incidentally, the computing system according to the third embodiment may further perform the following process and detect accuracy degradation of the machine learning model that corresponds to the monitoring target. The computing system inputs each of the pieces of training data included in the training data set to the inspector model, calculates the distance between each of the pieces of training data and the decision boundary 60, and specifies the average value of the distances as the "first distance".

The computing system calculates each of the distances between each of the pieces of operation data and the decision boundary 60 by inputting each of the pieces of operation data included in the operation data set to the inspector model, and specifies the average value of the distances as the "second distance".

If the difference between the first distance and the second distance is larger than or equal to the previously set threshold, the computing system detects accuracy degradation of the machine learning model by recognizing that concept drift has occurred.

As described above, the computing system according to the third embodiment is able to specify the instance corresponding to the cause of accuracy degradation by calculating the distance between the decision boundary 60 and the instance. Furthermore, the computing system is also able to detect accuracy degradation of the machine learning model by using the first distance obtained on the basis of each of the instances included in the training data set and the second distance obtained on the basis of each of the instances included in the operation data set.

Figure 29:
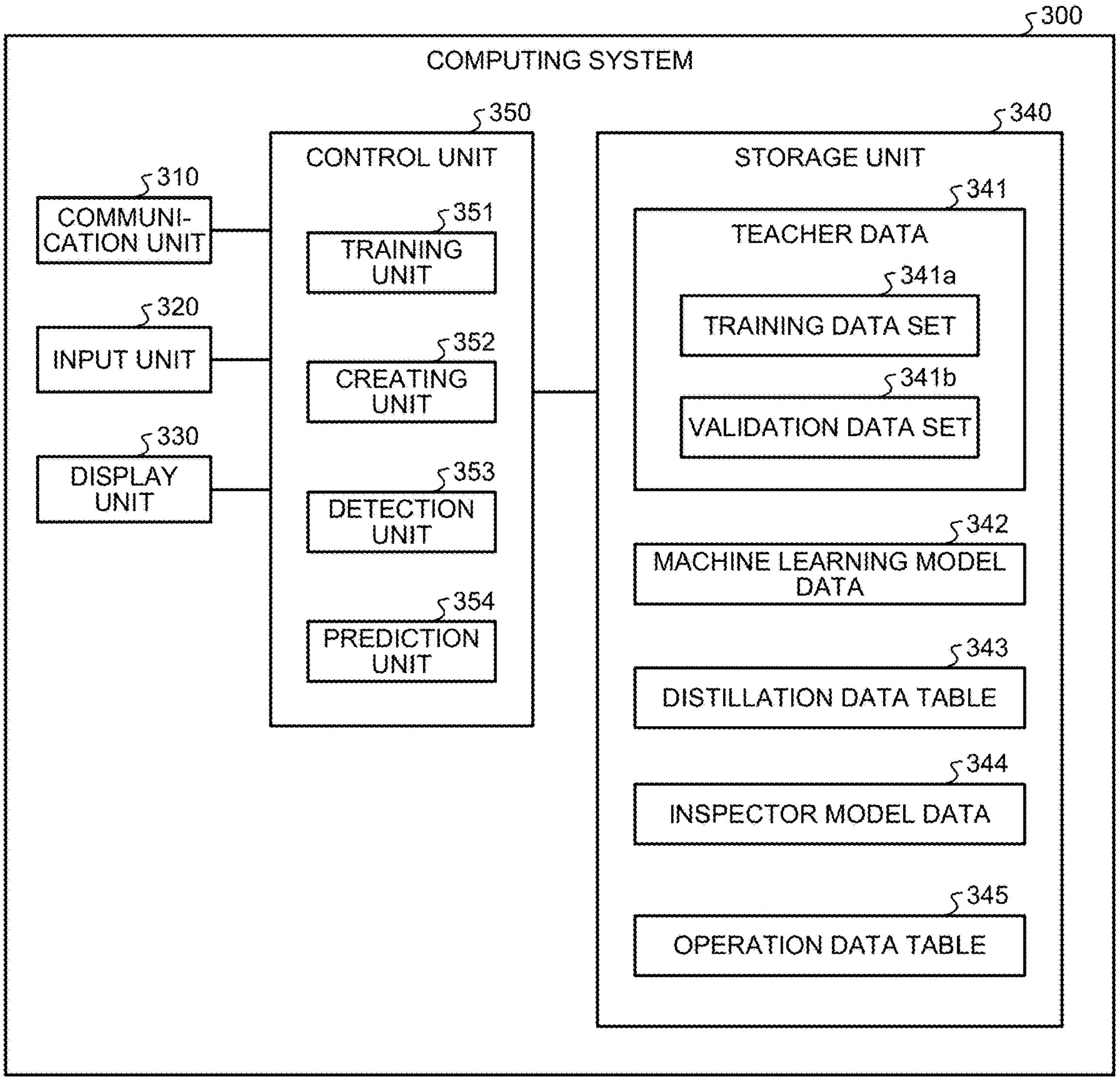
FIG. 29 is a functional block diagram illustrating a configuration of the computing system according to the third embodiment.

In the following, an example of a configuration of the computing system according to the third embodiment will be described. FIG. 29 is a functional block diagram illustrating the configuration of the computing system according to the third embodiment. As illustrated in FIG. 29, a computing system 300 includes a communication unit 310, an input unit 320, a display unit 330, a storage unit 340, and a control unit 350.

The communication unit 310 is a processing unit that performs data communication with an external device (not illustrated) via a network. The communication unit 310 is an example of a communication device. The control unit 350, which will be described later, sends and receives data to and from the external device via the communication unit 310.

The input unit 320 is an input device for inputting various kinds of information to the computing system 300. The input unit 320 corresponds to a keyboard, a mouse, a touch panel, or the like.

The display unit 330 is a display device that displays information that is output from the control unit 350. The display unit 330 corresponds to a liquid crystal display, an organic EL display, a touch panel, or the like.

The storage unit 340 includes teacher data 341, machine learning model data 342, a distillation data table 343, an inspector model data 344, and an operation data table 345. The storage unit 340 corresponds to a semiconductor memory device, such as a RAM or a flash memory, or a storage device, such as an HDD.

The teacher data 341 includes a training data set 341*a* and validation data 341*b*. The training data set 341*a* holds various kinds of information related to the training data. An explanation related to a data structure of the training data set 341*a* is the same as that of the data structure of the training data set 141*a* described above in the first embodiment.

The validation data 341*b* is data for validating the machine learning model that has been trained by the training data set 341*a*.

The machine learning model data 342 is data in the machine learning model. An explanation of the machine learning model data 342 is the same as that of the machine learning model data 142 described above in the first embodiment. In the third embodiment, a description be given with the assumption that the machine learning model corresponding to the monitoring target is the machine learning model 50. Furthermore, the classification algorithm of the machine learning model may be any one of classification algorithms from among an NN, a random forest, the k-nearest neighbors algorithm, a support vector machine, and the like.

The distillation data table 343 is a table that stores therein an output result (soft target) in the case where each of the pieces of data of a data set is input to the machine learning model 50. An explanation related to the data structure of the distillation data table 343 is the same as that of the data structure of the distillation data table 143 described above in the first embodiment.

The inspector model data 344 is data in the inspector model constructed by using the kSVM. An explanation related to the inspector model data 344 is the same as that related to the inspector model data 144 described above in the first embodiment.

The operation data table 345 includes an operation data set that is added in accordance with elapsed time. An explanation related to the data structure of the operation data table 345 is the same as that related to the operation data table 145 described above in the first embodiment.

The control unit 350 includes a training unit 351, a creating unit 352, a detection unit 353, and a prediction unit 354. The control unit 350 is able to be implemented by a CPU, an MPU, or the like. Furthermore, the control unit 350 is also able to be implemented by hard-wired logic, such as an ASIC or an FPGA.

The training unit 351 is a processing unit that acquires the training data set 341*a* and that trains a parameter of the machine learning model 50 on the basis of the training data set 341*a*. An explanation related to the process performed by the training unit 351 is the same as that related to the process performed by the training unit 151 described above in the first embodiment.

The creating unit 352 is a processing unit that creates an inspector model in which the decision boundary 31 between the model application area 31A and the model application area 31B has been trained on the basis of knowledge distillation of the machine learning model 50. The process of creating the inspector model performed by the creating unit 352 is the same process of creating the inspector model performed by the creating unit 152 described above in the first embodiment.

Furthermore, the creating unit 352 trains the hyperparameters A and B described above in Equation (2) on the basis of each of the pieces of training data and the correct answer label that are included in the training data set 341*a*. For example, the creating unit 352 adjusts the hyperparameters A and B such that a value obtained in the case where the feature value x of the training data associated with the correct answer label of the "first class" is input to Equation (2) approaches 1. The creating unit 352 adjusts the hyperparameters A and B such that a value obtained in the case where the feature value x of the training data associated with the correct answer label of the "second class" is input to Equation (2) approaches 0. The creating unit 352 trains the hyperparameters A and B by repeatedly performing the process described above by using each of the pieces of training data. The creating unit 352 outputs the data on the trained hyperparameters A and B to the detection unit 353.

The detection unit 353 is a processing unit that detects an instance that corresponds to a cause of accuracy degradation of the machine learning model 50. The detection unit 353 operates the inspector model 35. The detection unit 353 specifies the distance between the decision boundary 31 and the instance by selecting the instance (operation data) included in the operation data set and inputting the selected instance to the inspector model 35. Furthermore, the detection unit 353 calculates the certainty factor of the selected instance by inputting the specified distance f(x) to Equation (2).

If the certainty factor is less than the threshold, the detection unit 353 detects the selected instance as the instance that corresponds to a cause of accuracy degradation. The detection unit 353 detects the operation data corresponding to a cause of accuracy degradation by repeatedly performing the process described above on each of the pieces of operation data that are included in the operation data set.

The detection unit 353 may output and display, onto the display unit 330, the data on each of the instances (operation data) corresponding to the cause of accuracy degradation, or may transmit the data to an external device.

Incidentally, the detection unit 353 may further perform the following process and detect accuracy degradation of the machine learning model 50 that corresponds to the monitoring target. The detection unit 353 calculates the distance between each of the pieces of training data and the decision boundary 60 by inputting each of the pieces of training data included in the training data set 341*a* to the inspector model 35, and specifies the average value of the distances as the "first distance".

The detection unit 353 selects an operation data set from the operation data table 345. The detection unit 353 calculates each of the distances between each of the pieces of operation data and the decision boundary 60 by inputting each of the pieces of operation data included in the operation data set to the inspector model 35, and specifies the average value of the distances as the "second distance".

If a difference between the first distance and the second distance is larger than or equal to the threshold that is set in advance, the detection unit 353 detects accuracy degradation of the machine learning model 50 by recognizing that concept drift has occurred. The detection unit 353 repeatedly performs the process described above on each of the operation data sets that are added in accordance with elapsed time, and detects accuracy degradation of the machine learning model 50.

If the detection unit 353 detects accuracy degradation of the machine learning model 50, the detection unit 353 may display information indicating that accuracy degradation has been detected on the display unit 330, or may notify the external device (not illustrated) that accuracy degradation has been detected. The detection unit 353 may output and display, onto the display unit 330, data identification information on the operation data set serving as a basis of detecting the accuracy degradation. Furthermore, the detection unit 353 may notify the training unit 351 of information indicating that accuracy degradation has been detected, and may retrain the machine learning model data 342.

The prediction unit 354 is a processing unit that predicts, if the accuracy degradation of the machine learning model 50 is not detected, a classification class of each of pieces of the operation data by operating the machine learning model 50 and inputting the operation data set. The prediction unit 354 may output and display the prediction result onto the display unit 330, or may transmit the prediction result to an external device.

Figure 30:
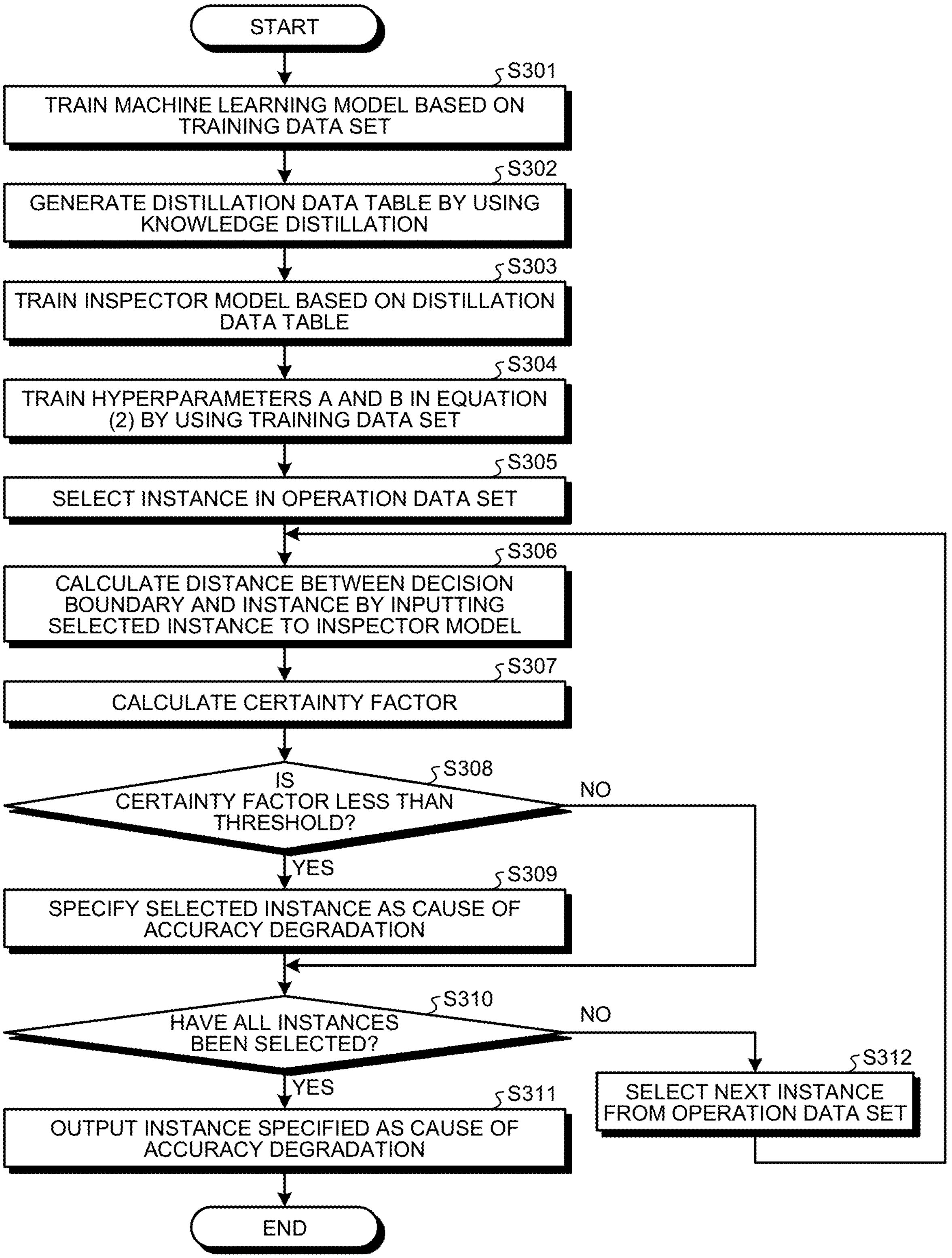
FIG. 30 is a flowchart illustrating the flow of a process performed by the computing system according to the third embodiment.

In the following, an example of the flow of the process performed by the computing system 300 according to the third embodiment will be described. FIG. 30 is a flowchart illustrating the flow of the process performed by the computing system according to the third embodiment. As illustrated in FIG. 30, the training unit 351 included in the computing system 300 trains the machine learning model 50 on the basis of the training data set 341*a* (Step S301).

The creating unit 352 included in the computing system 300 generates the distillation data table 343 by using knowledge distillation (Step S302). The creating unit 352 creates an inspector model on the basis of the distillation data table 343 (Step S303). The creating unit 352 trains the hyperparameters A and B expressed in Equation (2) by using the training data set 341*a* (Step S304).

The detection unit 353 included in the computing system 300 selects the instance included in the operation data set (Step S305). The detection unit 353 inputs the selected instance to the inspector model, and calculates the distance between the decision boundary and the instance (Step S306). The detection unit 353 calculates a certainty factor of the instance (Step S307).

If the certainty factor of the instance is not less than the threshold (No at Step S308), the detection unit 353 proceeds to Step S310. In contrast, if the certainty factor of the instance is less than the threshold (Yes Step S308), the detection unit 353 proceeds to Step S309.

The detection unit 353 specifies the selected instance as a cause of accuracy degradation (Step S309). If not all of the instances are selected (No at Step S310), the computing system 300 proceeds to Step S312. If all of the instances have been selected (Yes at Step S310), the computing system 300 proceeds to Step S311. The detection unit 353 outputs the instance specified as the cause of accuracy degradation (Step S311).

The process at Step S312 and the subsequent processes will be described. The detection unit 353 selects the next instance from the operation data set (Step S312), and proceeds to Step S306.

In the following, the effects of the computing system 300 according to the third embodiment will be described. The computing system 300 trains the inspector model by using knowledge distillation, and converts the distance between the instance and the decision boundary 60 in the feature space to the certainty factor. By converting the distance to the certainty factor, the computing system 300 is able to detect, regardless of the operation data set, the instance that corresponds to a cause of accuracy degradation.

The computing system 300 is also able to detect accuracy degradation of the machine learning model by using the first distance that is obtained on the basis of each of the instances included in the training data set, and the second distance that is obtained on the basis of each of the instances included in the operation data set.

Figure 31:
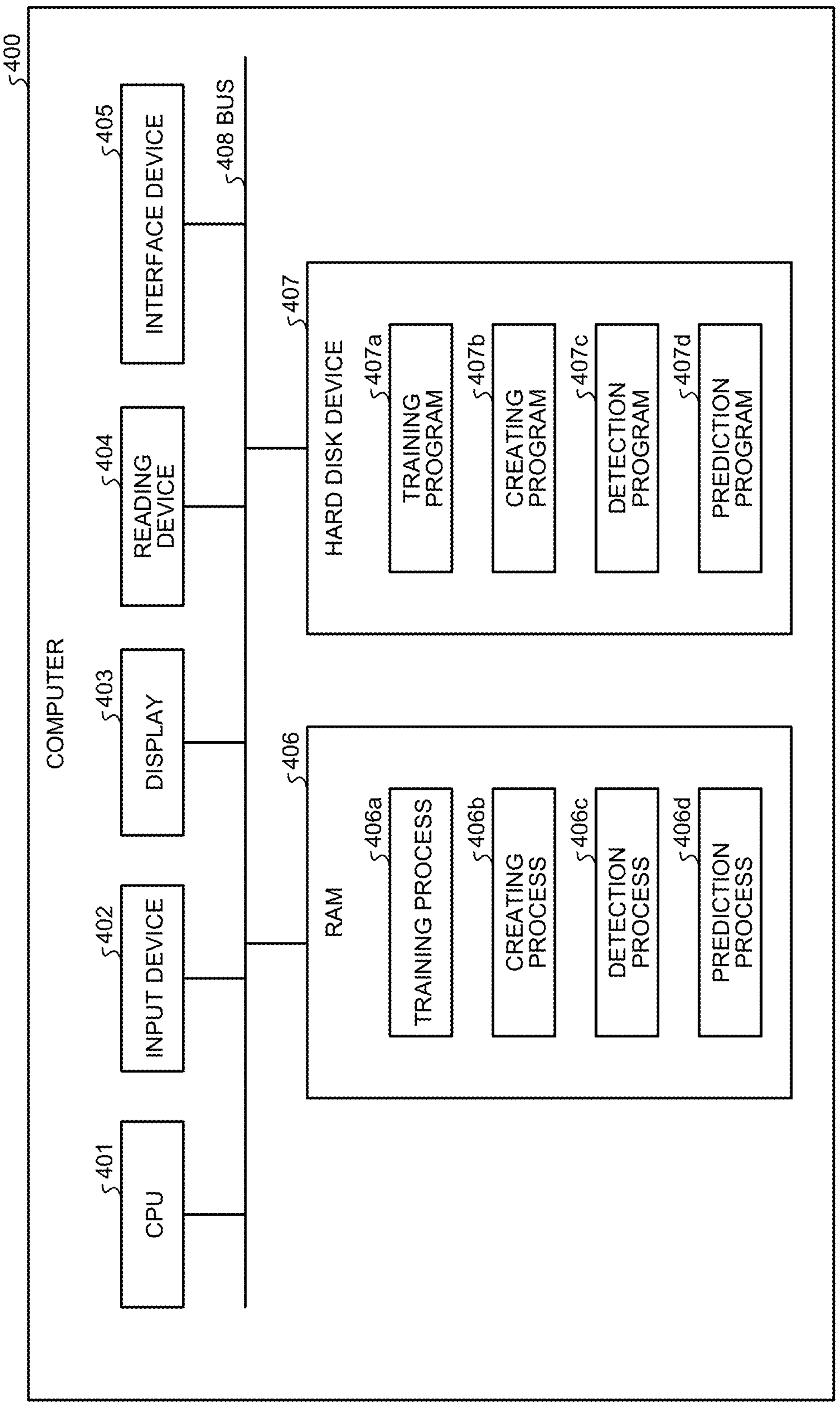
FIG. 31 is a diagram illustrating an example of a hardware configuration of a computer that implements the same function as that of the computing system according to the present embodiment.
Figure 32:
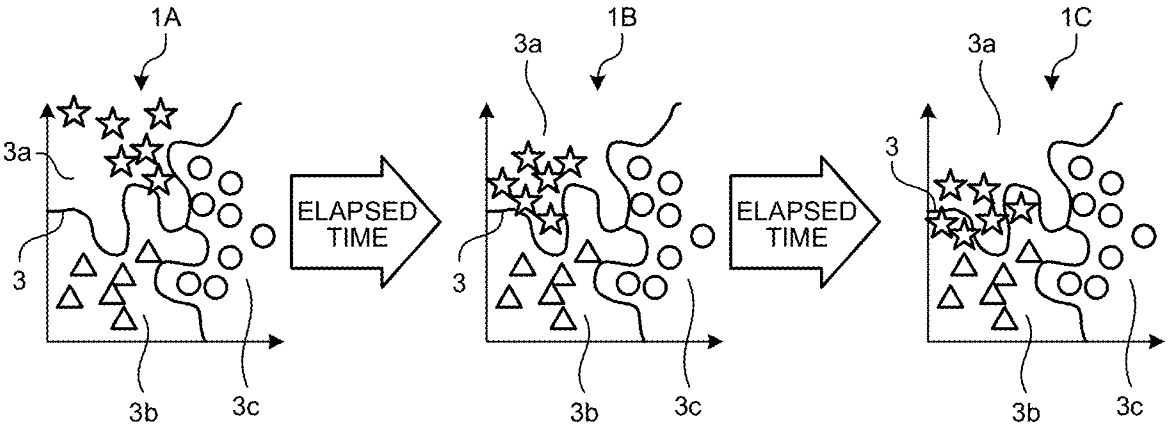
FIG. 32 is a diagram illustrating degradation of a machine learning model caused by a change in a tendency of input data.

In the following, an example of a hardware configuration of a computer that implements the same function as that of the computing system 100 (200 or 300) described above in the present embodiment will be described. FIG. 31 is a diagram illustrating an example of the hardware configuration of the computer that implements the same function as that of the computing system according to the present embodiment.

As illustrated in FIG. 31, a computer 400 includes a CPU 401 that executes various kinds arithmetic processing, an input device 402 that receives an input of data from a user, and a display 403. Furthermore, the computer 400 includes a reading device 404 that reads a program or the like from a storage medium, and an interface device 405 that sends and received data to and from an external device or the like via a wired or wireless network. The computer 400 includes a RAM 406 that temporarily stores therein various kinds of information, and a hard disk device 407. Then, each of the devices 401 to 407 is connected to a bus 408.

The hard disk device 407 includes a training program 407*a*, a creating program 407*b*, a detection program 407*c*, and a prediction program 407*d*. The CPU 401 reads the training program 407*a*, the creating program 407*b*, the detection program 407*c*, and the prediction program 407*d* and loads the programs into the RAM 406.

The training program 407*a* functions as a training process 406*a*. The creating program 407*b* functions as a creating process 406*b*. The detection program 407*c* functions as a detection process 406*c*. The prediction program 407*d* functions as a prediction process 406*d*.

The process of training process 406*a* corresponds to the process performed by each of the training units 151, 251, and 351. The process of the creating process 406*b* corresponds to the process performed by each of the creating units 152, 252, and 352. The process of the detection process 406*c* corresponds to the process performed by each of the detection units 153, 253, and 353. The process of the prediction process 406*d* corresponds to the process performed by each of the prediction units 154, 254, and 354.

Furthermore, each of the programs 407*a* to 407*d* does not need to be stored in the hard disk device 407 from the beginning. For example, each of the programs is stored in a "portable physical medium", such as a flexible disk (FD), a CD-ROM, a DVD disk, a magneto-optic disk, an IC card, that is to be inserted into the computer 400. Then, the computer 400 may also read each of the programs 407*a* to 407*d* from the portable physical medium and execute the programs.

It is possible to detect accuracy degradation of a machine learning model.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A computer-implemented detection method comprising:

inputting, to a machine learning model classifying high-dimensional image data, a plurality of pieces of training data configured with one of correct answer labels out of three or more types of correct answer labels, and training the machine learning model such that output results respectively match the correct answer labels configured for the input training data;

creating an inspector model configured to calculate a distance to operation data from a decision boundary for classifying a feature space of data into a plurality of application areas, the inspector model having learned the decision boundary by performing machine learning to allow the output results obtained by inputting the plurality of pieces of training data to the trained machine learning model to respectively match output results obtained by inputting the plurality of pieces of training data to the inspector model;

determining during the training of the inspector model, by using the inspector model, whether or not the plurality of pieces of training data are located in an area in which a distance from the decision boundary is less than or equal to a threshold, and acquiring, from the training data as a whole, a first proportion of the training data located in the area in which the distance from the decision boundary is less than or equal to the threshold to store the first proportion of the training data;

inputting to the inspector model, during an operation of the machine learning model and the inspector model, a plurality of pieces of the operation data that are classified by the machine learning model and that are configured with one of the correct answer labels out of three or more types of correct answer labels so as to calculate using the inspector model whether or not the plurality of pieces of the operation data are located in the area in which the distance from the decision boundary is less than or equal to the threshold, and acquiring, from the training data as a whole, a second proportion of the operation data located in the area in which the distance from the decision boundary is less than or equal to the threshold; and in response to identifying that the second proportion acquired during the operation is increased or decreased from the first proportion stored during the training detecting degradation in accuracy of the classification of the high-dimensional image data performed by the machine learning model.

2. The computer-implemented detection method according to claim 1, wherein the creating includes creating a plurality of the inspector models obtained by training the decision boundary that classifies the feature space of the data into one of the application areas and the other application areas.

3. The computer-implemented detection method according to claim 2, wherein the acquiring the first proportion includes acquiring the first proportion for each decision boundary of the plurality of inspector models, and the acquiring the second proportion includes acquiring the second proportion for each decision boundary of the plurality of inspector models.

4. The computer-implemented detection method according to claim 3, wherein the detecting includes detecting data corresponding to a cause of the change in the output result of the machine learning model based on the first proportion for each decision boundary in the plurality of inspector models and the second proportion for each decision boundary in the plurality of inspector models.

5. A non-transitory computer-readable recording medium having stored therein a detection program executable by one or more computers, the detection program comprising:

instructions for inputting, to a machine learning model classifying high-dimensional image data, a plurality of pieces of training data configured with one of correct answer labels out of three or more types of correct answer labels, and training the machine learning model such that output results respectively match the correct answer labels configured for the input training data;

instructions for creating an inspector model configured to calculate a distance to operation data from a decision boundary for classifying a feature space of data into a plurality of application areas, the inspector model having learned the decision boundary by performing machine learning to allow the output results obtained by inputting the plurality of pieces of training data to the trained machine learning model to respectively match output results obtained by inputting the plurality of pieces of training data to the inspector model;

instructions for determining during the training of the inspector model, by using the inspector model, whether or not the plurality of pieces of training data are located in an area in which a distance from the decision boundary is less than or equal to a threshold, and acquiring, from the training data as a whole, a first proportion of the training data located in the area in which the distance from the decision boundary is less than or equal to the threshold to store the first proportion of the training data;

instructions for inputting to the inspector model, during an operation of the machine learning model and the inspector model, a plurality of pieces of the operation data that are classified by the machine learning model and that are configured with one of the correct answer labels out of three or more types of correct answer labels so as to calculate using the inspector model whether or not the plurality of pieces of the operation data are located in the area in which the distance from the decision boundary is less than or equal to the threshold, and acquiring, from the training data as a whole, a second proportion of the operation data located in the area in which the distance from the decision boundary is less than or equal to the threshold; and instructions in response to identifying that the second proportion acquired during the operation is increased or decreased from the first proportion stored during the training, detecting degradation in accuracy of the classification of the high-dimensional image data performed by the machine learning model.

6. The non-transitory computer-readable recording medium according to claim 5, wherein the creating includes creating a plurality of the inspector models obtained by training the decision boundary that classifies the feature space of the data into one of the application areas and the other application areas.

7. The non-transitory computer-readable recording medium according to claim 6, wherein the acquiring the first proportion includes acquiring the first proportion for each decision boundary of the plurality of inspector models, and the acquiring the second proportion includes acquiring the second proportion for each decision boundary of the plurality of inspector models.

8. The non-transitory computer-readable recording medium according to claim 7, wherein the detecting includes detecting data corresponding to a cause of the change in the output result of the machine learning model based on the first proportion for each decision boundary in the plurality of inspector models and the second proportion for each decision boundary in the plurality of inspector models.

9. A computing system comprising:

one or more memories; and one or more processors coupled to the one or more memories, the one or more processors configured to input, to a machine learning mode classifying high-dimensional image data 1, a plurality of pieces of training data configured with one of correct answer labels out of three or more types of correct answer labels, and train the machine learning model such that output results respectively match the correct answer labels configured for the input training data, create an inspector model configured to calculate a distance to operation data from a decision boundary for classifying a feature space of data into a plurality of application areas, the inspector model having learned the decision boundary by performing machine learning to allow the output results obtained by inputting the plurality of pieces of training data to the trained machine learning model to respectively match output results obtained by inputting the plurality of pieces of training data to the inspector model, determine during the training of the inspector model, by using the inspector model, whether or not the plurality of pieces of training data are located in an area in which a distance from the decision boundary is less than or equal to a threshold, and acquire, from the training data as a whole, a first proportion of the training data located in the area in which the distance from the decision boundary is less than or equal to the threshold to store the first proportion of the training data, input to the inspector model, during an operation of the machine learning model and the inspector model, a plurality of pieces of the operation data that are classified by the machine learning model and that are configured with one of the correct answer labels out of three or more types of correct answer labels so as to calculate using the inspector model whether or not the plurality of pieces of the operation data are located in the area in which the distance from the decision boundary is less than or equal to the threshold, and acquire, from the training data as a whole, a second proportion of the operation data located in the area in which the distance from the decision boundary is less than or equal to the threshold, and in response to identifying that the second proportion acquired during the operation is increased or decreased from the first proportion stored during the training, detect degradation in accuracy of the classification of the high-dimensional image data performed by the machine learning model.

10. The computing system according to claim 9, the processor further configured to create a plurality of the inspector models obtained by training the decision boundary that classifies the feature space of the data into one of the application areas and the other application areas.

11. The computing system according to claim 10, the processor further configured to acquire the first proportion for each decision boundary of the plurality of inspector models and acquire the second proportion for each decision boundary of the plurality of inspector models.

12. The computing system according to claim 11, the processor further configured to detect data corresponding to a cause of the change in the output result of the machine learning model based on the first proportion for each decision boundary in the plurality of inspector models and the second proportion for each decision boundary in the plurality of inspector models.

* * * * *